(12) United States Patent
Fratini

(10) Patent No.: US 10,764,127 B2
(45) Date of Patent: Sep. 1, 2020

(54) TECHNIQUES FOR VIRTUALIZED NETWORK CAPACITY MANAGEMENT

(71) Applicant: Telefonaktiebolaget LM Ericsson (publ), Stockholm (SE)

(72) Inventor: Stephen Fratini, Piscataway, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 16/098,622

(22) PCT Filed: May 2, 2016

(86) PCT No.: PCT/IB2016/052483
§ 371 (c)(1),
(2) Date: Nov. 2, 2018

(87) PCT Pub. No.: WO2017/191484
PCT Pub. Date: Nov. 9, 2017

(65) Prior Publication Data
US 2019/0149406 A1 May 16, 2019

(51) Int. Cl.
*G06F 13/00* (2006.01)
*H04L 12/24* (2006.01)
(Continued)

(52) U.S. Cl.
CPC ...... *H04L 41/0806* (2013.01); *G06F 9/45558* (2013.01); *G06F 9/5077* (2013.01);
(Continued)

(58) Field of Classification Search
CPC .... G06F 9/5077; G06F 9/45558; G06F 9/455; G06F 2009/45595; H04L 12/4641; H04L 41/0806; H04L 41/5019
(Continued)

(56) References Cited

U.S. PATENT DOCUMENTS

| 8,201,180 B2 | 6/2012 | Briscoe et al. |
| 8,208,490 B2 | 6/2012 | Briscoe et al. |

(Continued)

FOREIGN PATENT DOCUMENTS

| EP | 2816481 | 12/2014 |

OTHER PUBLICATIONS

International Preliminary Report on Patentability, related International Patent Application PCT/IB2016/052483, dated Nov. 15, 2018, 8 pages.
(Continued)

*Primary Examiner* — Kenneth R Coulter
(74) *Attorney, Agent, or Firm* — Sage Patent Group

(57) ABSTRACT

Techniques are described for virtualized network capacity management. A hierarchical system includes a collection of capacity managers that can manage capacity providers providing resources such as compute resources, network resources, and/or storage resources to capacity consumers. The capacity managers can provide accurate capacity threshold reporting by decomposing any dependent capacity entities into a collection of independent capacity entities, thus enabling accurate available and unavailable capacity determinations. The capacity managers can implement capacity auditing procedures to detect variances between the intended and actual capacity allocation for each capacity provider. The capacity auditing can include audits between each capacity manager and the capacity providers that it manages, or audits between capacity managers. A cross-auditing procedure can be implemented to reconstruct capacity relationships from information in the capacity providers, and detect and isolate root causes of reoccurring problems that are usually only revealed when studying the results of multiple audits.

20 Claims, 9 Drawing Sheets

(51) Int. Cl.
  *G06F 9/50* (2006.01)
  *G06F 9/455* (2018.01)
  *H04L 12/46* (2006.01)
(52) U.S. Cl.
  CPC ...... *H04L 12/4641* (2013.01); *H04L 41/5019* (2013.01); *G06F 9/455* (2013.01); *G06F 2009/45595* (2013.01)
(58) Field of Classification Search
  USPC ........ 709/226, 201, 233, 235, 230, 223, 224
  See application file for complete search history.

(56) References Cited

U.S. PATENT DOCUMENTS

| | | | | |
|---|---|---|---|---|
| 8,938,541 | B2* | 1/2015 | Zhang | H04L 49/70 709/226 |
| 9,471,360 | B2* | 10/2016 | Ashok | G06F 9/45558 |
| 9,578,088 | B2* | 2/2017 | Nickolov | G06F 9/4856 |
| 9,588,797 | B2* | 3/2017 | Ashok | G06F 9/45558 |
| 9,806,975 | B2* | 10/2017 | Xiang | G06F 9/5077 |
| 9,858,095 | B2* | 1/2018 | Breitgand | G06F 9/45533 |
| 9,959,909 | B1* | 5/2018 | Chang | G06F 1/187 |
| 2013/0346493 | A1 | 12/2013 | Martin | |
| 2014/0040343 | A1 | 2/2014 | Nickolov et al. | |
| 2014/0082612 | A1* | 3/2014 | Breitgand | G06F 9/45533 718/1 |
| 2014/0122724 | A1* | 5/2014 | Zhang | G06F 9/5072 709/226 |
| 2015/0261557 | A1* | 9/2015 | Ashok | H04L 47/70 718/1 |
| 2015/0261561 | A1* | 9/2015 | Ashok | H04L 47/70 718/1 |
| 2015/0365352 | A1 | 12/2015 | Xiang | |

OTHER PUBLICATIONS

ETSI GS NFV 002: "Network Functions Virtualisation (NFV); Architectural Framework", V1.2.1, Dec. 2014, 21 pages.
ETSI GS NFV-IFS 006: "Network Functions Virtualisation (NFV); Management and Orchestration; Vi-Vnfm reference point—Interface and Information Model Specification", V2.1.1, Apr. 2016, 109 pages.
ETSI GS NFV-IFS 007: "Network Functions Virtualisation (NFV); Management and Orchestration; Or-Vnfm reference point—Interface and Information Model Specification", work in progress, V0.7.0, Mar. 2016, 103 pages.
International Search Report and Written Opinion, related International Patent Application PCT/IB2016/052483, dated Jan. 5, 2017, 12 pages.
M. Kesavan, et al., "Practical compute capacity management for virtualized datacenters," IEEE Transactions on Cloud Computing, vol. 1, No. 1, pp. 88-100, 2013, 13 pages.

* cited by examiner

TECHNIQUES FOR VIRTUALIZED NETWORK CAPACITY MANAGEMENT

CROSS-REFERENCE TO RELATED APPLICATIONS

This application is a national stage of International Application No. PCT/IB2016/052483, filed May 2, 2016, which is hereby incorporated by reference.

FIELD

Embodiments relate to the field of computing systems; and more specifically, to techniques for virtualized network capacity management.

BACKGROUND

Cloud computing has made available to businesses, individuals, and other organizations a more dynamic environment for virtualized compute, storage and network. Cloud computing providers implement cloud computing environments that can provide computation, capacity, networking, and/or storage on-demand to its customers, typically relying upon virtualization techniques such as virtual networks and/or virtual machines (VMs), which can increase the operational efficiency of the cloud consumer and more easily enable dynamic resource provisioning in response to the changing application needs of its customers. For example, multiple VMs can be hosted by a single physical server, thus increasing the utilization rate and energy efficiency of the cloud system. Accordingly, cloud service consumers typically lease virtual compute, network, and storage resources distributed among one or more physical infrastructure resources in one or more data centers.

One example of a cloud environment is called a Telco Cloud that can host telecommunications applications, such as IP Multimedia Subsystem (IMS), Push To Talk (PTT), Internet Protocol Television (IPTV), etc. A Telco Cloud often has a set of unique requirements in terms of Quality of Service (QoS), availability, and reliability. While conventional Internet-based cloud hosting systems, are server-centric, a Telco Cloud is more network-centric, including many networking devices, and having complex network architecture with various layers and protocols. The Telco Cloud infrastructure provider may allow multiple Virtual Telecom Operators (VTOs) to share, purchase or rent virtual network and compute resources of the Telco Cloud to provide telecommunications services to end-users.

However, with the use of virtualization techniques and the changing workloads placed upon a cloud provider resulting from services being launched or terminated, it has become increasingly difficult for cloud providers to monitor the capacity usage of the cloud system and ensure, as best as possible, an efficient alignment between capacity supply and demand. It has become apparent that the desired level of alignment between capacity supply and demand is varies from organization to organization. Further, the desired level of alignment for a given organization can change over time.

In addition to problems involving the alignment of capacity supply and demand in such systems, there are other related problems that are also important, including but not limited to the difficulty in identifying and releasing "stranded" capacity, and both monitoring and fulfilling Service Level Agreements (SLAs) between the provider and customers.

Although some of these problems have been studied and addressed in non-virtualized networks, they are currently unsolved in the context of virtualized networks, such as those facilitated by Software Defined Networking (SDN) and/or Network Functions Virtualization (NFV). For example, existing solutions dealing with non-virtualized networks do not contemplate, and cannot be extended to accommodate, virtualized networks employing multiple capacity layers. Accordingly, techniques are desired that can solve any or all of these problems in virtualized contexts.

SUMMARY

Techniques for virtualized network capacity management are described. According to some embodiments, a method in a capacity manager module implemented by a computing device for accurately determining available capacity in a virtualized resource infrastructure includes decomposing each capacity entity type of a plurality of capacity entity types available for provisioning in the virtualized resource infrastructure into a plurality of independent entity types provided by one or more capacity provider modules. Each of the plurality of capacity entity types, when executed as an instance, utilizes one or more of the plurality of independent entity types. Each of the plurality of independent entity types do not depend upon others of the plurality of independent entity types. The method also includes determining requirement data that includes, for each of the plurality of capacity entity types, a required amount of each of the corresponding plurality of independent entity types needed to provide the capacity entity types. The method also includes receiving, from each of the one or more capacity provider modules, capacity messages including current availability information associated with those of the plurality of independent entity types provided by the capacity provider module. The current availability information indicates amounts of those of the plurality of independent entity types that are able to be allocated or amounts of those of the plurality of independent entity types that are already allocated. The method also includes providing virtualized resource infrastructure availability information to a client. The virtualized resource infrastructure availability information describes at least some of the plurality of capacity entity types and is generated based upon the current availability information and the determined requirement data.

In some embodiments, the method also includes generating the virtualized resource infrastructure availability information, which includes comparing one or more thresholds corresponding to one or more of the plurality of independent entity types with some of the current availability information pertaining to the one or more of the plurality of independent entity types.

In some embodiments, the method also includes receiving, from a first capacity provider module of the one or more capacity provider modules, a capacity change message indicating that an amount of an independent entity type provided by the first capacity provider module has changed.

In some embodiments, the method also includes receiving, from a first capacity consumer, a first capacity request message indicating a desire to allocate one or more instances of one or more of the plurality of capacity entity types. In some embodiments, the method also includes determining, based upon the at least some of the current availability information and at least some of the determined requirement data, that a second capacity provider module of the one or more capacity provider modules is to be sent a first capacity allocation request corresponding to the first capacity request message. In some embodiments, the method also includes transmitting the first capacity allocation request to the second capacity provider module to cause the one or more instances to be provided by the one or more capacity provider modules.

In some embodiments, the method also includes receiving, from a third capacity provider module, a capacity allocation information message indicating that one or more instances of one or more of the plurality of capacity entity types has been allocated responsive to the third capacity provider module receiving a second capacity request message from a second capacity consumer, and updating, based upon the capacity allocation information message, the current availability information.

In some embodiments, the method also includes receiving, from a third capacity consumer, a third capacity request message indicating a desire to allocate one or more instances of one or more of the plurality of capacity entity types, and transmitting a second capacity allocation request corresponding to the third capacity request message to a second capacity manager module that manages another one or more capacity provider modules, to cause the one or more instances to be provided by the another one or more capacity provider modules.

In some embodiments, the method also includes initiating an audit process with each of the one or more capacity provider modules to detect whether a variance between an intended capacity allocation from a perspective of the capacity manager module and an actual capacity allocation from a perspective of the capacity provider module exists.

In some embodiments, the method also includes initiating an audit process with a third capacity manager module to detect whether a variance between an intended capacity allocation from a perspective of the capacity manager module and an actual capacity allocation from a perspective of the third capacity manager module exists. In some embodiments, the method also includes, upon detecting the variance, transmitting a request message to attempt to cause the variance to be fixed.

In some embodiments, the request message comprises a request to allocate an instance of a capacity entity type of the plurality of capacity entity types, and in some embodiments, the request message comprises a request to de-allocate an instance of a capacity entity type of the plurality of capacity entity types. In some embodiments, the method also includes performing, by an auditing module, a cross-auditing process by examining auditing results from multiple historic audits from a log, detecting, by the auditing module, a recurring allocation problem as a result of the performing of the cross-auditing process, and transmitting a message to report the recurring allocation problem.

According to some embodiments, a non-transitory computer-readable storage medium has instructions which, when executed by one or more processors of a device, cause the device to perform any of the above methods, such as performing operations for accurately determining available capacity in a virtualized resource infrastructure including, determining available capacity in a virtualized resource infrastructure includes decomposing each capacity entity type of a plurality of capacity entity types available for provisioning in the virtualized resource infrastructure into a plurality of independent entity types provided by one or more capacity provider modules. Each of the plurality of capacity entity types, when executed as an instance, utilizes one or more of the plurality of independent entity types. Each of the plurality of independent entity types do not depend upon others of the plurality of independent entity types. The operations also include determining requirement data that includes, for each of the plurality of capacity entity types, a required amount of each of the corresponding plurality of independent entity types needed to provide the capacity entity types. The operations also include receiving, from each of the one or more capacity provider modules, capacity messages including current availability information associated with those of the plurality of independent entity types provided by the capacity provider module. The current availability information indicates amounts of those of the plurality of independent entity types that are able to be allocated or amounts of those of the plurality of independent entity types that are already allocated. The operations also include providing virtualized resource infrastructure availability information to a client. The virtualized resource infrastructure availability information describes at least some of the plurality of capacity entity types and is generated based upon the current availability information and the determined requirement data.

According to some embodiments, a computer program product has computer program logic arranged to put into effect any of the above methods. For example, the computer program logic can accurately determine available capacity in a virtualized resource infrastructure, which includes decomposing each capacity entity type of a plurality of capacity entity types available for provisioning in the virtualized resource infrastructure into a plurality of independent entity types provided by one or more capacity provider modules. Each of the plurality of capacity entity types, when executed as an instance, utilizes one or more of the plurality of independent entity types. Each of the plurality of independent entity types do not depend upon others of the plurality of independent entity types. The computer program logic can cause a determining of requirement data that includes, for each of the plurality of capacity entity types, a required amount of each of the corresponding plurality of independent entity types needed to provide the capacity entity types. The computer program logic can cause a receiving, from each of the one or more capacity provider modules, capacity messages including current availability information associated with those of the plurality of independent entity types provided by the capacity provider module. The current availability information indicates amounts of those of the plurality of independent entity types that are able to be allocated or amounts of those of the plurality of independent entity types that are already allocated. The computer program logic can cause a providing virtualized resource infrastructure availability information to a client. The virtualized resource infrastructure availability information describes at least some of the plurality of capacity entity types and is generated based upon the current availability information and the determined requirement data.

According to some embodiments, a device includes one or more processors and a non-transitory computer-readable storage medium. The non-transitory computer-readable storage medium has instructions which, when executed by the one or more processors, cause the device to performing operations for accurately determining available capacity in a virtualized resource infrastructure by performing operations including determining available capacity in a virtualized resource infrastructure includes decomposing each capacity entity type of a plurality of capacity entity types available for provisioning in the virtualized resource infrastructure into a plurality of independent entity types provided by one or more capacity provider modules. Each of the plurality of capacity entity types, when executed as an instance, utilizes one or more of the plurality of independent entity types.

Each of the plurality of independent entity types do not depend upon others of the plurality of independent entity types. The operations also include determining requirement data that includes, for each of the plurality of capacity entity types, a required amount of each of the corresponding plurality of independent entity types needed to provide the capacity entity types. The operations also include receiving, from each of the one or more capacity provider modules, capacity messages including current availability information associated with those of the plurality of independent entity types provided by the capacity provider module. The current availability information indicates amounts of those of the plurality of independent entity types that are able to be allocated or amounts of those of the plurality of independent entity types that are already allocated. The operations also include providing virtualized resource infrastructure availability information to a client. The virtualized resource infrastructure availability information describes at least some of the plurality of capacity entity types and is generated based upon the current availability information and the determined requirement data.

According to some embodiments, capacity usage can be monitored and as best as possible of an efficient alignment between capacity supply and demand can be enforced. In some embodiments, stranded capacity can be eliminated in large systems, in which resources are assigned and allocated for use but not actually being utilized. In some embodiments, the system can ensure that capacity consumers are getting the level/amount of resources that they are entitled to (e.g., according to a Service Level Agreement (SLA)), and can take corrective actions when the entitlements are not met.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
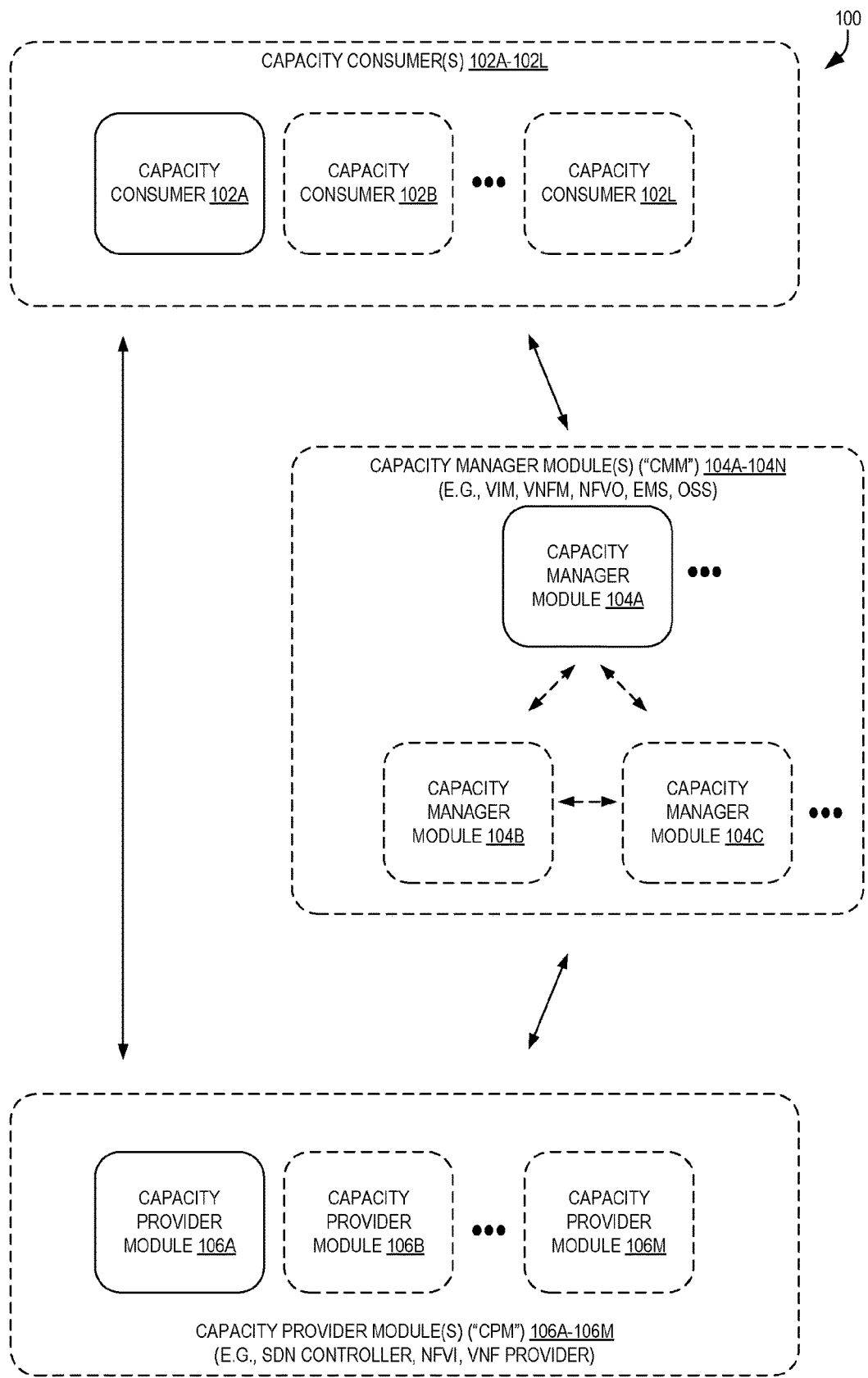
FIG. 1 is a high-level block diagram of a system including one or more capacity consumers, one or more capacity managers, and one or more capacity providers arranged in an architecture for virtualized network capacity management according to some embodiments.

The following description describes techniques for virtualized network capacity management. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques are described for virtualized network capacity management. According to some embodiments, a hierarchical system includes a collection of one or more capacity managers that can manage one or more capacity providers providing resources to capacity consumers, such as compute resources, network resources, storage resources, etc. Accordingly, embodiments can monitor capacity usage and ensure as best as possible an efficient alignment between capacity supply and demand. In some embodiments, stranded capacity can be eliminated in large systems, in which resources are assigned and allocated for use but not actually being utilized. In some embodiments, the system can ensure that capacity consumers are getting the level/amount of resources that they are entitled to (e.g., according to a Service Level Agreement (SLA)), and can take corrective actions when the entitlements are not met.

In some embodiments, the capacity managers can be configured to provide accurate capacity threshold reporting. The capacity threshold reporting, in some embodiments, decomposes any dependent capacity entities into a collection of independent capacity entities, enabling accurate available and unavailable capacity determinations, which can include current capacity determinations and expected future capacity determinations. Accordingly, some embodiments utilize a decomposition of a (potentially dependent) collection of capacity entities into independent collection of capacity entities, where monitoring and capacity requests can be serviced based on the collection of independent entities.

In some embodiments, the capacity managers can implement capacity auditing procedures according to a multi-tiered (or multi-level) approach, which can detect variances between the intended and actual capacity allocation for each capacity provider under the purview of an organization. In some embodiments, capacity auditing can include audits between each capacity manager and the capacity providers that it manages. Further, in some embodiments, capacity auditing can include audits between capacity managers. Accordingly, some embodiments can take into account the multi-level dependencies of virtualized networks, and can accommodate dynamic resource inventories through maintaining relationships between virtual and physical capacity layers.

Moreover, according to some embodiments, a cross-auditing procedure can be implemented that can be used to reconstruct capacity relationships from information in the capacity providers. The cross-auditing procedure can be implemented by an independent functional block (i.e., other than one of the capacity managers) and can be based on the embedding of tracking information in objects (i.e., in the software sense of the word) that represent the various capacity entities. Accordingly, the cross-auditing processes can detect and isolate root causes of reoccurring problems that are usually only revealed when studying the results of multiple audits.

FIG. 1 is a high-level block diagram of a system including one or more capacity consumers, one or more capacity managers, and one or more capacity providers arranged in an architecture for virtualized network capacity management according to some embodiments.

A central problem in large scale, virtualization-heavy network environments is to effectively monitor capacity usage and ensure as best as possible of an efficient alignment between capacity supply and demand. This naturally results from cloud environments utilizing virtualization techniques to provide virtualized resources/services using underlying physical resources, where the virtualized resources can frequently be scaled-up and scaled-down in a dynamic manner. In these scenarios, it is tremendously difficult to manage capacity as there no longer is a direct relationship between the hardware and the load. For example, previously, certain network services could be provided by physical devices such as cards, circuit packs, and physical network devices, whereas in virtualized environments there may now be one or more layers of software obscuring the underlying hardware from the consumer.

Notably, the desired level of "alignment" between supply and demand is subjective in nature, and is best determined by the particular organization(s) managing the capacity. This results in trade-offs. For example, having a large over-supply of capacity is costly (e.g., increased capital expenditures, management, electricity utilization, etc.) but also results in a higher probability that capacity consumers will have their requests fulfilled immediately. The converse of the above example is also true—not having a large over-supply of capacity is not as costly, but results in a lower probability that capacity consumers will have their requests fulfilled immediately.

While the alignment of capacity supply and demand is one key problem, there are other related problems which are also important.

For example, in these environments there remains a need to avoid "stranded capacity", where a capacity manager has information indicating that a resource is currently assigned and allocated to a capacity consumer (and thus, cannot be used for another purpose) but in fact, the resource is available for use. This stranded capacity is effectively "wasted" because it should be available for allocation, but remains idle.

An additional problem in such environments involves SLA monitoring and fulfillment. A capacity manager needs to make sure the capacity consumers are getting precisely what has been promised to them (via an SLA or similar)—no more and no less. Accordingly, this task requires monitoring (perhaps in the form of audits) to make sure the capacity SLAs are met, and to take corrective actions when an SLA is not met.

Turning to FIG. 1, in terms of managing virtual capacity, some embodiments can serve requests from one or more capacity consumers 102A-102L through the use of one or more capacity manager modules ("CMM") 104A-104N together with one or more capacity provider modules ("CPM") 106A-106M. As used herein, the terms "capacity manager" and "capacity manager module" may be used synonymously to refer to a unit (e.g., implemented by software, a combination of software and hardware, or hardware alone) performing operations disclosed herein. Similarly, the terms "capacity provider" and "capacity provider module" may also be used synonymously to refer to a unit (e.g., implemented by software, a combination of software and hardware, or hardware alone) performing operations disclosed herein.

The one or more capacity consumers 102A-102L can be an entity that uses capacity offered by a capacity provider (e.g., 106A-106M). For example, in some embodiments a capacity consumer can be a user (who is typically distinct from the entity/entities employing the capacity managers 104A-104N and/or capacity providers 106A-106M) issuing requests via a webpage or application, a software instance (e.g., an executing program), etc.

Each capacity manager 104A-104N is an entity that governs the relationship between capacity providers and capacity consumers. A capacity manager monitors capacity consumption and can take actions to align capacity supply and demand. Similar to that utilized in European Telecommunications Standards Institute (ETSI) NFV, examples of capacity managers can be a Virtual Infrastructure Manager (VIM) tool, a Virtual Network Functions (VNF) Manager (VNFM) tool, a Network Functions Virtualization Orchestrator (NFVO) tool, an Element Management System (EMS) tool (sometimes also called an Element Manager), an Operation Support System (OSS) tool, etc.

In some embodiments, capacity managers can be "layered" or arranged in a hierarchy, and thus it is possible for a capacity manager not to have direct access to any capacity producers but rather only to manage other capacity managers.

The capacity providers 106A-106M each act as an entity that offers capacity to other entities, and can be implemented as part of, for example, a Software Defined Network (SDN) controller, Network Functional Virtualization Infrastructure (NFVI), a Virtual Network Function (VNF) provider, etc. Accordingly, the capacity providers 106A-106M can, together or individually, provide resources to satisfy requests. For example, a capacity provider 106A can execute (or "spin up") one or more virtual machines (VM), instantiate VNFs, execute software applications, reserve networking resources, reserve storage resources, etc., on behalf of a capacity consumer 102A-102L.

However, some embodiments are configured according to a "Separation of Concerns" model such that neither a capacity provider nor its associated capacity manager need to understand or account for how the capacity it provides/allocates actually gets used by capacity consumers. For example, in NFV-based embodiments, a VIM may allocate virtualized resources such as storage, compute, and/or network to VNFMs, but may not know anything about the VNF (managed by the VNFM) a given virtualized resource supports. Similarly, in some NFV-based embodiments, a VNFM need not know anything about how an NFVO uses the VNFs allocated by the VNFM to the NFVO.

Some embodiments are configured to utilize one capacity manager per one or more capacity providers. The capacity manager, in this case, can essentially act as a sole agent for each associated capacity provider. Thus, in some embodiments, requests (for immediate and future reservation) for capacity relative to a given capacity provider may go through the associated capacity manager.

Figure 2:
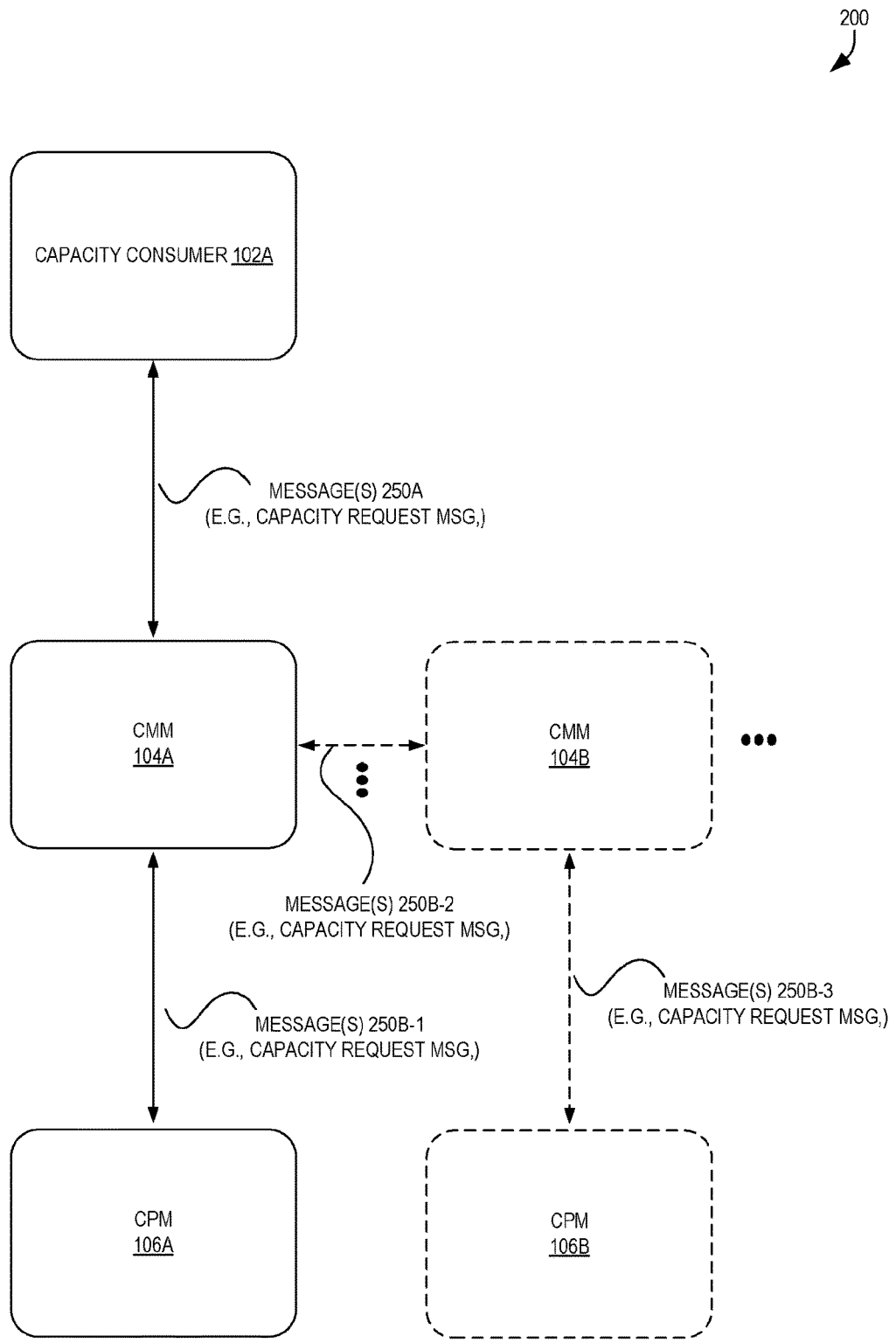
FIG. 2 is a block diagram illustrating an inline deployment of a capacity manager, and an optional hierarchical deployment of multiple capacity managers, according to some embodiments.

For example, FIG. 2 is a block diagram illustrating an inline deployment 200 of a capacity manager, and an optional hierarchical deployment of multiple capacity managers according to some embodiments. In this example, the term "inline" is used to indicate that requests for capacity to be allocated from capacity consumers are made via capacity managers here, the capacity consumer 102A can send one or more message(s) 250A (such as capacity request messages) to the capacity manager 104A, which can itself send one or more message(s) 250B-1 (such as capacity request messages, which may be the same as or similar to the messages 250A received from the capacity consumer 102A) to the capacity provider 106A. Alternatively, as will be described in further detail later herein, the capacity manager 104A, responsive to receipt of the message(s) 250A (and possibly in response to determining that the capacity provider 106A under its management cannot satisfy a capacity request indicated by the message 250A), can send one or more message(s) 250B-2 to another capacity manager 104B. The capacity manager 104B may then, if it determines that capacity is available via capacity provider 106B, send one or more message(s) 250B-3 to the capacity provider 106B. Otherwise, the capacity manager 104B could send back a response message 250B-2 indicating that it cannot service the request, or it could send on one or more additional messages toward another (non-illustrated) capacity manager.

Figure 3:
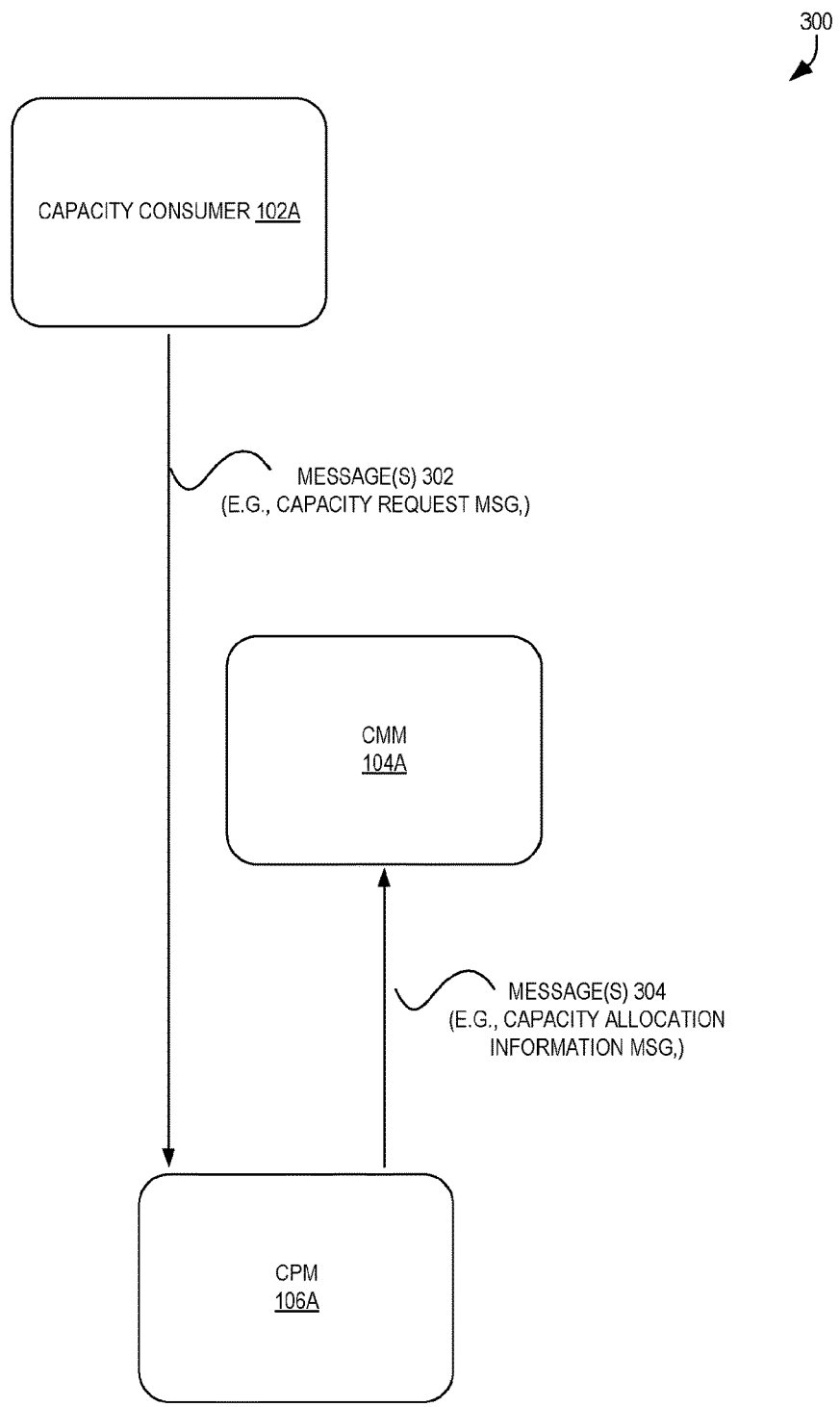
FIG. 3 is a block diagram illustrating a non-inline deployment of a capacity manager according to some embodiments.

As opposed to this inline deployment of FIG. 2, in some embodiments, requests for capacity may be sent from the capacity consumer directly to a given capacity provider (e.g., capacity provider module 106A), which then can be reported back to its capacity manager (e.g., capacity manager 104A) in a variety of ways. For example, FIG. 3 is a block diagram illustrating a non-inline deployment 200 of a capacity manager 104A according to some embodiments. In this example, the capacity consumer 102A can "directly" interact with the capacity provider 106A by sending it one or more message(s) 102 such as capacity request messages indicating a desire for capacity to be allocated to the capacity consumer 102A, etc. The term "directly" is used to indicate that the capacity manager 104A need not be involved (e.g., act as an intermediary) between the capacity consumer 102A and the capacity manager 106A. Instead, in this illustrated embodiment, the capacity manager 106A may provide information to the capacity manager 104A via one or more message(s) 304. The one or more message(s) 304 can include reporting data indicating levels of virtual and/or physical utilization (e.g., a number of virtual entities that are operational, an amount of reserved storage), or can provide data based upon the message(s) 302 received from the capacity consumer 102A (e.g., it can include some or all of a capacity request message, etc.) to thereby allow the capacity manager 104A to perform its management functions. Further, in the case of auto-scaling, capacity provider 106A can automatically allocate additional resources to capacity consumer 102A (e.g., based on capacity depletion detection on the part of the capacity provider 106A). In such cases, a capacity allocation message 303 would be sent from the capacity provider 106A to the capacity manager 104A.

As the amount of virtual resources available to a given capacity provider are depleted, the associated capacity manager can be configured to make arrangements (e.g., issue order requests) to replenish that capacity. The order requests can be for virtual and/or physical resources. However, this arrangement hints at a key complexity, i.e., there can be multiple levels of virtual capacity and (potentially) a different owner (business entity, etc.) for each such level.

In some embodiments, the capacity manager for a given capacity provider can also ensure that various capacity policies are maintained. For example, the capacity manager can ensure that a given quantity of a given resource is available for allocation at all times. This can include, for example maintaining a pre-defined surplus level for a given resource type.

In terms of inputs, a capacity manager can be configured to receive capacity requests from capacity consumer modules, and possibly configured to receive capacity requests from other capacity managers—either acting in the role of a consumer, or on behalf of other capacity consumer modules.

In some embodiments, a capacity manager can be configured to process policy management requests (related to capacity management) from other authorized entities, and/or receive (or retrieve) information about capacity availability changes (e.g., capacity additions or capacity subtractions—i.e., the addition or subtraction of resources that can be allocated to capacity consumer modules) with regard to the capacity producer modules that it manages.

In terms of outputs, a capacity manager can be configured to send capacity allocation requests to the capacity providers that it manages, which can occur responsive to receipt of capacity requests from a capacity consumer, for example.

In some embodiments, a capacity manager can be configured to send capacity allocation requests to subtending (or even peer) capacity managers. In this context, the term "peer" is used in the sense that two capacity managers send capacity allocation requests to each other, rather than only one of the two exclusively sending requests to the other, which can also be implemented in other embodiments.

Further, in some embodiments, a capacity manager can be configured to send order requests (or similar requests) to other entities (e.g., an ordering system) to replenish the capacity of the capacity producer modules that it manages. Thus, the capacity manager is not to be an "ordering" application, but it can nonetheless request more (or in some embodiments, less) underlying physical capacity for the capacity producer modules that it manages.

To this end, in some embodiments the capacity manager utilizes a knowledge of the relationship between the virtual resource types offered by a capacity producer module and the associated underlying (physical) resources required to support the virtual resource types. For example, the capacity manager can be configured to order additional resources for first type of virtual resource (e.g., a particular application) that it knows utilizes one or more other types of physical and/or virtual resources—e.g., an amount of storage space or processors as physical resources, and/or an amount of other virtual resources (e.g., a software load balancer), which can eventually be broken down into its underlying physical resources over one or more decomposition iterations.

Alternately, in other embodiments the (remote) ordering system may understand the relationship between virtual entities and the required physical support, and thus, the capacity manager could issue order requests in terms of virtual entities.

As indicated earlier with regard to FIG. 2, in some embodiments the capacity managers 104A-104B can be configured to interact with each other for the sake of management tasks. To this end, the capacity managers 104A-104B can be configured to perform granting tasks. Granting is an NFV concept where one capacity manager (or "asking party") asks another capacity manager (or "granting party") for permission to request a given virtual resource from yet another capacity manager (a "target party"). If the request is granted (e.g., by an NFVO capacity manager), the Asking party (e.g., a VNFM capacity manager) can go directly to the target party in this interaction (e.g., a VIM capacity manager) and issue the desired capacity request. However, in some embodiments there is still no guarantee that the target party will in fact be able to honor the request from the asking party. In either case (success or failure), the granting party can be informed of the outcome in order to keep track of resource allocation by the target party. The basic assumption here is that the granting party is the entity having a more extensive (albeit, perhaps not necessarily global) view of virtual resource allocation and consumption, and thus stays involved with all interactions related to virtual resource allocation/de-allocation.

Although several somewhat complex options with regard to granting can be implemented, such as those found in a draft European Telecommunications Standards Institute (ETSI) NFV specification: Draft ETSI GS NFV-IFA 007 V0.7.0 (2016-03), *Network Functions Virtualisation (NFV); Management and Orchestration; Or-Vnfm reference point— Interface and Information Model Specification*, some of the complexity can be reduced in embodiments described herein. For example, a capacity manager (e.g., a VNFM capacity manager) can be configured to accept and make use of policy directives, and thus does not need to continually go to an NFVO capacity manager to verify policy decisions. Thus, in some embodiments, the utilization of this hierarchal approach is more direct and provides fewer complications than the alternatives. In this way (e.g., for NFV), the VNFM capacity managers would be seen as clients of an NFVO capacity manager (or to be more precise, a Resource Orchestrator variant of an NFVO) which, in turn, acts as a client of one of more VIM capacity managers. The NFVO capacity manager would thus effectively federate the virtualized resource views of several VIM capacity managers and present a consolidated view to one of more VNFM capacity managers. Thus, in some embodiments no granting would be needed as the NFVO could directly accept virtualized resource requests from a VNFM capacity manager, directly make a request to the appropriate VIM capacity manager, and reply back to the VNFM capacity manager once it (i.e., the NFVO capacity manager) hears back from the VIM capacity manager.

In some embodiments, the capacity managers 104A-104N can additionally or alternatively be configured to interact with each other for the sake of another management task involving pre-allocation. To this end, a capacity manager 104A (here, a "pre-allocator") can be configured to indicate to a consumer (e.g., capacity consumer 102A, or another capacity manager 104B acting as a consumer) how much of a given virtualized resource it can consume from a set of one or more producers (e.g., a given capacity provider, or group of capacity providers). The pre-allocator can enforce the assignment either via an honor system (i.e., the consumer self-regulates and does not go beyond what has been pre-allocated) or the producer (i.e., capacity provider) or its associated managing capacity manager can be provided sufficient information to make sure the consumer does not go beyond the pre-allocated amount of the given virtualized resource.

For example, an NFVO (a first capacity manager) can inform a given VNFM (a second capacity manager) that it can use a given quantity of a given virtualized resource as managed by a given VIM (a third capacity manager). Within the given boundary, the VNMF (i.e., the second capacity manager) can send requests to the VIM (i.e., the third capacity manager) for instances of the given virtualized resource on an as-needed basis.

Capacity Monitoring

There are two basic cases with regard to capacity monitoring. In one case, the entities on which the producer is providing capacity reports, are independent. A collection of two or more entity types is said to be independent with respect to capacity management if it satisfies two conditions. First, that the collection of entity types does not depend on each other directly—e.g., resource type X does not use resource type Y and vice versa. Second, at least one of the following conditions is met: the entity types in the collection to be monitored for capacity usage do not depend on common (underlying) entity types, or the entities types in the collection to be monitored for capacity usage may depend on common (underlying) entity types, but availability of these common entity types is not an issue (e.g., because they are easily and quickly replenished or there is some policy to always have a sufficient supply of such resources). If the entities do not satisfy the first and second conditions, they are referred to as being either directly or indirectly dependent.

According to some embodiments, a set of general considerations can be implemented to enable capacity monitoring. First, that it is possible to report on capacity thresholds as percentages, in absolute numbers, or both. Second, that it is possible to apply capacity thresholds to allocated/in-use capacity and the complementary measure, i.e., available (consumable) capacity. Third, that it is possible to apply multiple levels of capacity thresholds to a given entity under consideration. Fourth, that it is possible to specify capacity thresholds for raise and clear, where the threshold for a clear need not be equal to the associated threshold for a raise. Fifth, that it is possible to apply a threshold to a subset of the entities of a given type under the management of a given producer—for example, the instances of a given entity type available to a given consumer or some subdivision within a consumer, or all entities of a given type within the same geographic region, etc.

In some embodiments, capacity threshold reporting (e.g., from capacity providers to capacity managers) can be implemented utilizing capacity threshold reports on the entities under consideration (e.g., virtualized resources). Previous capacity threshold reporting, in some cases, yields misleading results. For example, assume that two entity types "X" and "Y" are at a 75% capacity threshold, but types X and Y both depend on some underlying resource of type "Z." The consumer may assume that allocation of capacity of types X and Y can both be increased by ⅓ before reaching the capacity of each, but this may not be possible because of the shared dependency on type Z.

Accordingly, embodiments can address this problem by decomposing a dependent collection of entity types (which are to be monitored for capacity levels) into an associated independent collection of entities.

For example, let $A=\{X_1, X_2, \ldots, X_n\}$ be the collection of dependent entity types. Note that not every entity type is dependent on all the other entities, and in fact, some in the set may be independent from all the other types in the set. The point is that there are some dependencies in the set.

Thus, the elements of set A can be decomposed (as needed) into a new set of independent entity types $B=\{Y_1, Y_2, \ldots, Y_m\}$ and the requirements for each entity in set A can be expressed in terms of entities in set B. To be more precise, for 1 unit of each type $X_i$, the required number of units of $Y_1, Y_2, \ldots Y_m$ are determined.

As a more concrete example, we could define set A as including dependent capacity entities=$\{X_1, X_2, X_3\}$, where $X_1$=a video service, $X_2$=a Content Distribution Network (CDN) service, and $X_3$=a storage service. Thus, using one or more iterations of decomposition, each of these capacity entities could be decomposed until independent entity types are identified that do not depend upon each other—e.g., cloud storage servers, compute capabilities, load balancing capabilities, firewalls, etc.

Regarding the capacity of a given type, some embodiments reference "capacity units" (or just "units" for short) of a given type rather than the number of instances, as a given instance (e.g., a connectivity/transport type of resource) can use varying amounts of essential capacity.

In embodiments utilizing this approach, a capacity manager can set thresholds for the elements in set B, and make its own determination concerning the current and desired capacity for the elements in set A based on the threshold-crossing information obtained from the capacity producer. Accordingly, in some embodiments the quantitative relationships between the elements in sets A and B are known to both the capacity manager and producer.

In some embodiments, when making requests for additional entities (resources and/or services), the capacity manager may formulate orders in terms of the entities in set B and not the entities in set A. That is to say, given known targets for the desired number of each type of entity in set A, the capacity manager can be configured to determine how many capacity units for each type of entity in set B are needed, and then order additional underlying capacity for the resource types in set B.

In some embodiments, reporting from capacity providers to capacity consumers is different than reporting from capacity providers to capacity managers. Capacity consumers, compared to capacity managers, are typically interested in capacity thresholds concerning the SLAs for the entity types that have been allocated for them, but not in the underlying dependencies, as it is the responsibility of the capacity provider and associated capacity manager to make sure the underlying dependencies are managed properly so that the SLAs to the capacity consumers are upheld.

Further, in terms of making requests for additional entities (resources and/or services), in some embodiments capacity consumers are not concerned about underlying entity dependencies but rather in the allocation of instances of the specific entity types that it needs (regardless of the underlying dependencies), and thus their requests can identify the specific entity types (e.g., from set A above) and not the underlying entities (e.g., from set B above).

Capacity Auditing

Figure 4:
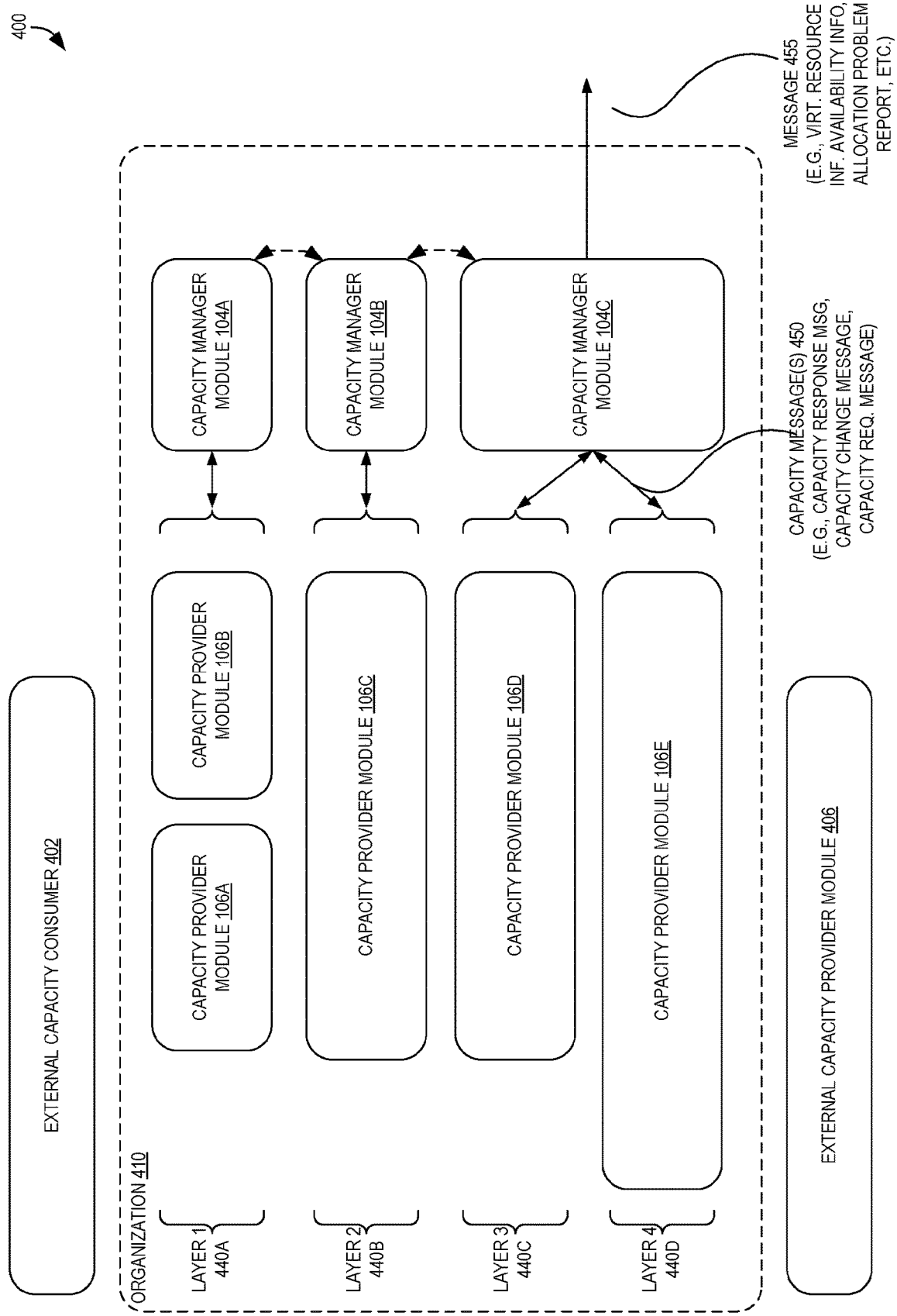
FIG. 4 is a block diagram illustrating a hierarchical deployment of multiple capacity providers and capacity managers according to some embodiments.

In addition to capacity monitoring, some embodiments implement advanced capacity auditing. A given organization, utilizing and/or providing capacity (typically, for revenue assurance purposes), performs audits on the allocation and assignment of its capacity. However, this can be very complex, as an organization is typically responsible for (e.g., owns) one or more layers of capacity and the associated management. For example, FIG. 4 is a block diagram illustrating a hierarchical deployment 400 of multiple capacity providers and capacity managers according to some embodiments. FIG. 4 shows an (example) organization 410 (inside of the dashed, closed curve) and the capacity providers (e.g., external capacity provider module 406) and consumers (e.g., external capacity consumer 402, which may contract/purchase capacity from the organization).

Within and visible to the capacity managers 104A-104C of the organization 410 are layers of capacity management providers/consumers as layer 1 440A, layer 2 440B, layer 3 440C, and layer 4 440D. Each layer may represent different levels of abstraction—for example, layer 4 440D could be a physical layer including physical appliances such as router devices, fiber optic lines, load balancer devices, etc., while layer 3 440C could include VNFs (e.g., logical representations of physical devices) such as a "virtual" load balancer or packet inspector, while layer 2 440B could include network services (e.g., combinations of VNFs), etc.

In some embodiments, the roles of provider/consumer can be relative, with each layer playing both roles. Of course, the capacity manager modules can communicate with each other, and the capacity manager modules can communicate with the associated capacity provider module(s) under their management (e.g., using capacity messages 450). Further, the capacity manager module(s) 104A-104C can be configured to provide data via message(s) 455 to other entities—illustrated (e.g., external capacity consumer 402, external capacity provider module 406, etc.) or non-illustrated (e.g., a system/network administrator, etc.).

In terms of auditing, an organization 410 needs to keep track of various relationships, such as those relationships between capacity entities (resources and services) in the various internal layers 440A-440D as well as the relationships to external organizations (both consumers 402 and providers 406). Accordingly, scenarios where virtual entities are mapped to (i.e., supported by) physical entities are particularly difficult to track as they may change over time, and may require some form of dynamic inventory for tracking.

For the purposes of explanation, several use cases are now presented to assist in showing the utility of capacity auditing implemented by some embodiments. One category of use case involves stranded capacity problems, where capacity is effectively available for allocation but the associated capacity manager is not aware of this. One possible scenario leading to this situation includes capacity being configured incorrectly (or incompletely) but still being reported (e.g., to the associated capacity manager) as not available for use. Another possible scenario is that the capacity was configured correctly (perhaps manually) but is not reported as being available for allocation to the associated capacity manager. Additionally, the association between the entity (e.g., a service) and the capacity (e.g., a virtualized resource) used by the entity may be terminated, but for some reason, the state of the capacity (or more precisely, the state of the entity representing the deallocated capacity) is not updated to show that it is now available for allocation. These scenarios result in stranded capacity.

Moreover, capacity auditing techniques employed by some embodiments provide SLA monitoring and fulfillment purposes. An organization (such as the one depicted in FIG. 4) may need to verify that its SLA commitments (with regard to capacity) to external consumers are being met. Thus, in some embodiments the SLA management application of the service provider organization (not shown in the Figure) can request SLA verification from the various capacity managers. Further, in some embodiments internal SLAs between capacity layers can be audited utilizing these techniques.

According to some embodiments, a general approach is implemented under the assumption that the various capacity providers are the best source for what is actually allocated in terms of capacity, and the capacity managers are the best source for what is intended to be allocated. When the two views don't match, corrective measures are taken. Thus, in some embodiments, a first step is to detect the mismatches using a multi-tiered approach.

First, a set of capacity management requests and notifications are sent. In some embodiments, processes can be configured to report on capacity allocations, modifications to allocations, and de-allocations. In some embodiments, this includes responses to capacity requests, and optionally autonomous notifications (which, for example, can be useful when capacity providers are able to re-arrange capacity on their own, i.e., independent of commands from the associated capacity manager).

In the example depicted in FIG. 4, capacity manager 104C might request the allocation of capacity from capacity layer 3 440C (i.e., capacity provider 106D). Thus, capacity layer 3 440C would respond to capacity manager 104C.

In some scenarios, this approach can be sufficient, but as is well known, such processes do not always work as planned. This points to the needs for capacity audits.

In some embodiments, there are several levels involved in a complete audit of capacity allocation.

First, audits between a capacity manager and the capacity providers that it manages can be performed. In some embodiments, each capacity manager audits the various capacity providers that it manages. Accordingly, each capacity provider is configured to be able to respond to requests concerning the capacity it provides (including un-allocated capacity). In the example depicted in FIG. 4, capacity manager 104C would be responsible to initiate audits on capacity layer 3 440C and capacity layer 4 440D. This can also include checking the validity of capacity associations (dependencies/assignments) between the two capacity layers as they are both under the purview of capacity manager 104C.

Additionally, some embodiments can implement audit between capacity managers. Compared to manager-provider auditing, in some embodiments an additional level of auditing is utilized between capacity managers. One key difference from the previous case is that now a given capacity manager can accept capacity requests from several other capacity managers, while in the previous case, only one capacity manager per capacity provider is typically utilized. Thus, in this case of auditing between capacity managers, in some embodiments the capacity managers are configured to be able to segregate the views it provides to other capacity managers.

In some embodiments, auditing includes an Audit Analysis and Reconciliation phase. For purposes of simplicity and ease of understanding, it is assumed that in the context of this phase capacity providers are under the control of a single capacity manager and within a single organization, though certainly this is not the case in all embodiments.

Embodiments implementing Audit Analysis and Reconciliation phase can detect and attempt to remedy a variety of problems under a "first type" of auditing. For example, a problem can be detected when the capacity provider has no record of a capacity allocation but the capacity manager's information does show such an allocation. For example, in NFV, the VNF Functional Block might show no record of a VNF of which the VNFM does believe to exist. In such cases, in some embodiments the capacity manager can (again) request the desired capacity (perhaps, but not necessarily, from the same capacity provider) and report the discrepancy to whatever entity (human or higher-level system) is responsible to address the source of such problems.

As another example, a problem can be detected where the capacity provider shows a specific allocation of capacity but the capacity manager's information does not show such an allocation. This is an example of stranded capacity, where capacity is effectively allocated but not being used. For example, in NFV, perhaps the VNF Functional Block may show the existence of a VNF which the VNFM does not believe to exist. In such cases, in some embodiments the capacity manager can be configured to request a deletion (i.e., a de-allocation) of the stranded capacity and report the discrepancy to whatever entity is responsible to address the source of such problems.

As yet another example, a problem can be detected where the capacity manager detects an assignment mismatch between two of the capacity layers that it manages. In FIG. 4, assume for example that the Resource X is allocated in capacity layer 4 440D (as intended), and Resource Y is allocated in capacity layer 3 440C (as intended), and although X is supposed to be assigned to Y, in reality that is not the case. In such cases, in some embodiments the capacity manager can be configured to make appropriate requests to the capacity providers to correct the problem and report the discrepancy to whatever entity is responsible to address the source of such problems. It is important to note that a given capacity provider does not typically know how its consumers are using the capacity allocated to them. For example, a VNF Functional Block does not know to which Network Service a given VNF (capacity) is assigned by the consumer. However, in some embodiments, the associated capacity manager can detect/deduce a mismatch by an analysis of the server capacity relationship. Returning to the VNF example, the NFVO can deduce that a given VNF (because of its relationships, as revealed in the capacity provider—the VNF functional block (FB) in this case) is supporting the wrong Network Service.

Another auditing scenario referred to as a "second type" of audit under an Audit Analysis and Reconciliation phase is now presented where the capacity managers are configured to interact directly with regard to the capacity that one manager has allocated to another. In the analysis that follows, a distinction is made between the roles of a consumer capacity manager and provider capacity manager. The roles are relative and may change (even between the same two capacity managers). The capacity managers could be within the same organization, or they could be in different organizations. In principle, similar auditing procedures can be used in both cases, but may be limited by security or other business concerns.

In this case, embodiments can detect and remedy a variety of problems. For example, a scenario can occur where a providing capacity manager has no record of a capacity allocation but the consuming capacity manager's information does show such an allocation. In such cases, in some embodiments the consuming capacity manager can be configured to (again) request the desired capacity (perhaps, but not necessarily, from the same capacity manager) and report the discrepancy to whatever entity (human or higher-level system) is responsible to address the source of such problems. The providing capacity manager which need to access the capacity providers that is manages to allocated the requested capacity. This could very well instigate an audit of the first type, as described above.

As another example, a problem can be detected where the providing capacity manager shows a specific allocation of capacity, but the consuming capacity manager's information does not show such an allocation. In such cases, in some embodiments the consuming capacity manager can be configured to request deletion (i.e., a de-allocation) of the (effectively) stranded capacity and report the discrepancy to whatever entity is responsible to address the source of such problems. Similarly, this could very well instigate an audit of the first type, as described above.

As another example, a problem can be detected where the consuming capacity manager detects an assignment mismatch between the capacity it manages and the supporting capacity that is managed by the producing capacity manager. In such cases, in some embodiments the consuming capacity manager can be configured to make appropriate requests to the providing capacity manager to correct the problem and report the discrepancy to whatever entity is responsible to address the source of such problems. As with the third example presented above with regard to the "first type" of audit, the providing capacity manager likely does not know how its consumers are using the capacity allocated to them. However, the consuming capacity manager can detect/deduce a mismatch by an analysis of the capacity relationships as represented by the producing capacity manager.

Embodiments can also perform cross-auditing (e.g., collectively auditing the results from multiple audits), which includes procedures that can help with the detection and isolation of recurring problems that may only be revealed when analyzing the results of multiple audits. Typically, at intervals spanning several audits, embodiments perform a cross-auditing procedure to attempt to find and stop recurring problems.

For example, some embodiments perform cross-auditing by performing one or more of the following pattern searches across multiple audits: detecting a same object instance getting out of synchronization multiple times; detecting a same object type (and perhaps same attribute or set of attributes) getting out of synchronization multiple times; detecting a larger than usual number of problems found at a given time of day or around the time of specific events, such as software upgrades or the installation of new equipment.

As problem patterns are detected, embodiments can be configured to examine the history record of changes in order to isolate (i.e., identify) the root cause of the problem. As noted below, system/application logs, inventory snapshots, and/or embedded information in object instance(s) can be used to store aspects of the historic record of changes to capacity-related object instances. For example, logs can be utilized that record the various allocations and de-allocations of capacity related to each capacity provider and capacity manager. This can include external requests to a given capacity provider or manager, as well as internally initiated capacity events (e.g., capacity re-arrangements based on previous set policies). Logs can be helpful in isolating recurring problems that are detected when looking across multiple audits.

Additionally, in some embodiments a snapshot cross-auditing procedure entails analyzing a detailed snapshot of all capacity allocations related to each capacity provider and capacity manager on some regular basis (e.g., once per day). Although snapshots may miss changes that happen within the intra-snapshot intervals—e.g., a capacity allocation and de-allocation within a given intra-snapshot interval would not appear any snapshot—logs, however, would detect such changes. On the other hand, logs do not provide any relationships between the capacity entities whereas the snapshots can. However, snapshots can also be helpful in isolating recurring problems that are detected when looking across multiple audits. Accordingly, some embodiments include both log analysis and snapshot analysis as part of cross-auditing.

Further, in some embodiments, tracking information is embedded in the capacity entities themselves. In embodiments utilizing this approach, the entities (e.g., objects) of the capacity providers can be enhanced with higher-level information (e.g., information not known to the capacity provider concerning usage of the given capacity entity by its consumer) that can help in tracking capacity allocation/assignment problems. In some embodiments, several past relationships can be stored. This approach can be viewed as a mixture of the log and snapshot approaches. For example, in some embodiments one or more of the multiple information types can be encoded in each object that represents capacity.

A first exemplary type of information that can be embedded is the name(s) of the supported entities. For example, a VNF can have the name (or names) of the Network Service (NS) or NS s that it supports (or, is functioning to implement). In some embodiments, the capacity provider keeps track of capacity relationships within its domain. For capacity relationships that span capacity providers (still under one capacity manager, however), the capacity manager can set a "names of supported entities" attribute.

A second exemplary type of information that can be embedded is a time stamp (e.g., in Coordinated Universal Time (UTC)) as to when the "names of support entities" attribute was last set, and/or an indicator of by whom—e.g., the capacity provider for internal capacity relationship, or the capacity manager in capacity relationships that extend outside of capacity provider's domain.

Of course, many other types of information can be embedded such that the embedded information can be observed and utilized by capacity managers tracking capacity allocation/assignment problems. Accordingly, the above two types are merely exemplary and not limiting.

Figure 5:
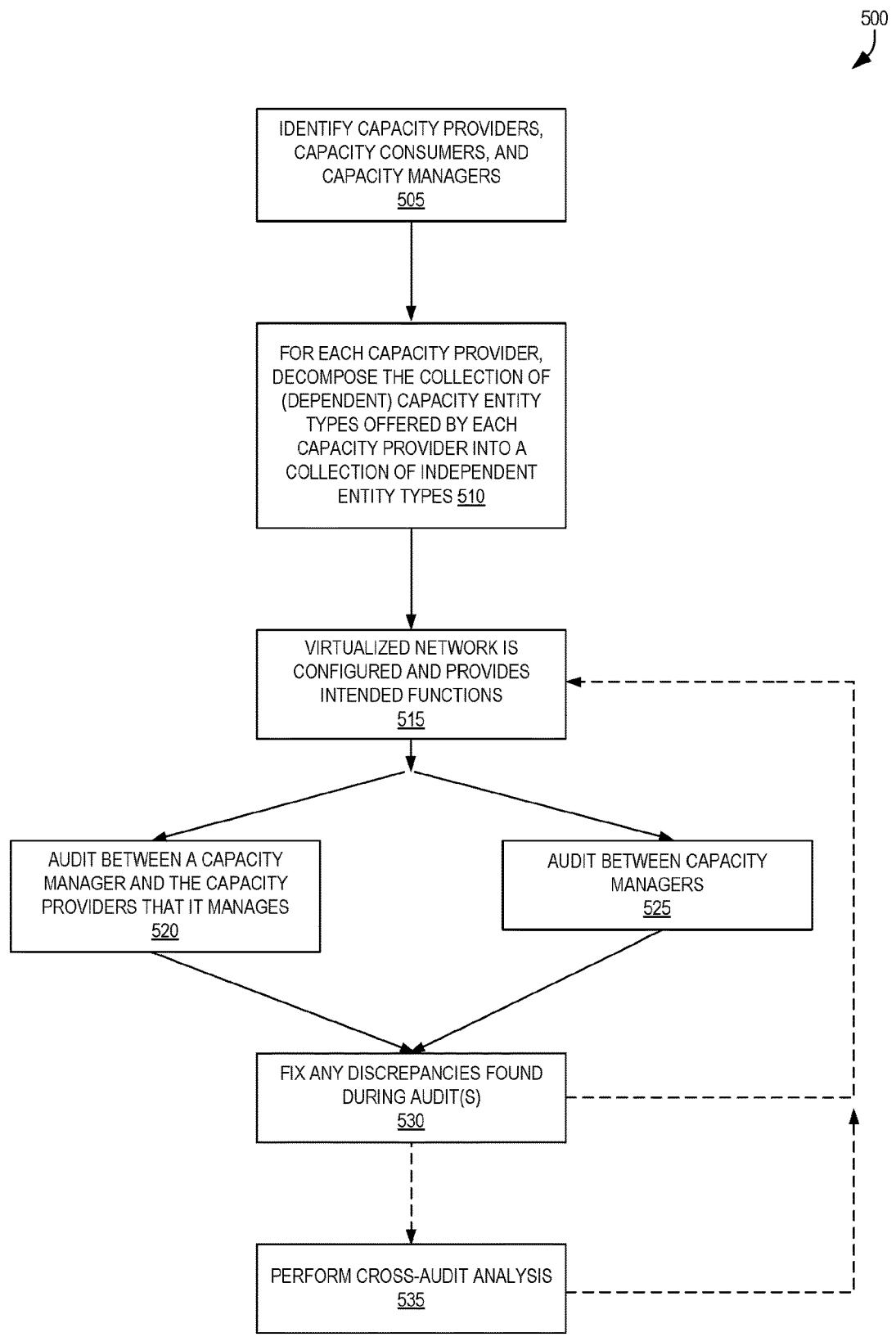
FIG. 5 is a flow diagram illustrating a system flow for virtualized network capacity management according to some embodiments.

For an example of an implementation of some of these techniques, we turn to FIG. 5, which is a flow diagram illustrating a system flow 500 for virtualized network capacity management according to some embodiments. One or more of these operations can be performed by one or more capacity manager modules of an organization, for example, and in some embodiments other, different modules can perform some of these operations.

The operations in this and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

This example of FIG. 5 presents an overall process for capacity management from the point of view of a single organization that needs to manage capacity with respect its virtualized network resources and services.

At block 505, the organization identifies the various involved functional blocks, i.e., capacity providers (internal and external), capacity consumers (internal and external), and its capacity managers. In some embodiments, block 505 includes determining exactly what type of capacity is offered, used, and/or managed for each of the involved functional blocks.

At block 510, for each capacity provider under its control (i.e., each internal capacity provider), the organization decomposes the collection of (most likely dependent) capacity entity types offered by each capacity provider into a collection of independent entity types. In some embodiments, capacity reporting data (e.g., various thresholds concerning capacity depletion) can be provided for the collection of independent entity types, not the original collection of dependent capacity entities.

Thus, at block 515, the virtualized network is configured and can begin to provide its intended functions.

When the virtualized network is first initialized and when updates are made, in some embodiments, block 515 includes the capacity providers reporting on capacity changes (e.g., capacity additions, capacity modifications, capacity deletions) to their associated capacity managers. Each capacity manager may already have been populated with information concerning planned capacity, which can be used to compare with the capacity change reports (e.g., received during block 515) from the capacity providers that it manages. This is the first level of checking to make sure capacity is being updated as intended.

Accordingly, in some embodiments, one or both of block 520 and/or block 525 can be performed. In some embodiments, one or both of these blocks are performed on a scheduled basis, each to perform a type of audit.

At block 520, the flow 500 includes performing an audit between a capacity manager and the capacity providers that it manages. In some embodiments, each capacity manager is configured to audit each of the one or more capacity providers that it manages. In some embodiments, each capacity manager can send one or more capacity requests to each capacity provider seeking information about the capacity that it provides (including un-allocated capacity amounts), and each capacity provider will respond to the capacity requests with the requested information. Block 520 can then include determining whether a local view of the capacity of each of the capacity providers matches the information that is returned form the capacity providers. If a mismatch occurs, it is deemed a discrepancy. Block 520 can also include a checking of the validity of capacity associations (dependencies/assignments) between the capacity layers under the purview of the capacity manager.

At block 525, the flow 500 includes performing an audit between capacity managers. As indicated earlier, another level of auditing (compared to the capacity manager-provider auditing of block 520) can be utilized between capacity managers—recall that one difference from the manager-provider auditing results from the assumption that a given capacity manager can accept capacity requests from several other capacity managers while in the manager-provider auditing of block 520, only one capacity manager per capacity provider is assumed. In this case (i.e., auditing between capacity managers), a capacity manager can be configured to segregate the views it provides to other capacity managers.

Regardless of whether one or both of blocks 520 or 525 are performed, at block 530 the flow 500 includes fixing any discrepancies (as detected in blocks 520 or 525) are addressed as described earlier herein.

The flow 500 can optionally continue back to block 515, where the system continues to execute until one or both of blocks 520 or 525 are again to be performed.

In some embodiments, though, at block 535 a cross-auditing process can be performed, which can include one or more of the above-described cross-auditing practices (e.g., regarding log-based auditing, snapshot-based auditing, tracking information auditing, etc.) that can help with tracing and isolating problems. These practices are not mutually exclusive and can be used in various combinations.

Figure 6:
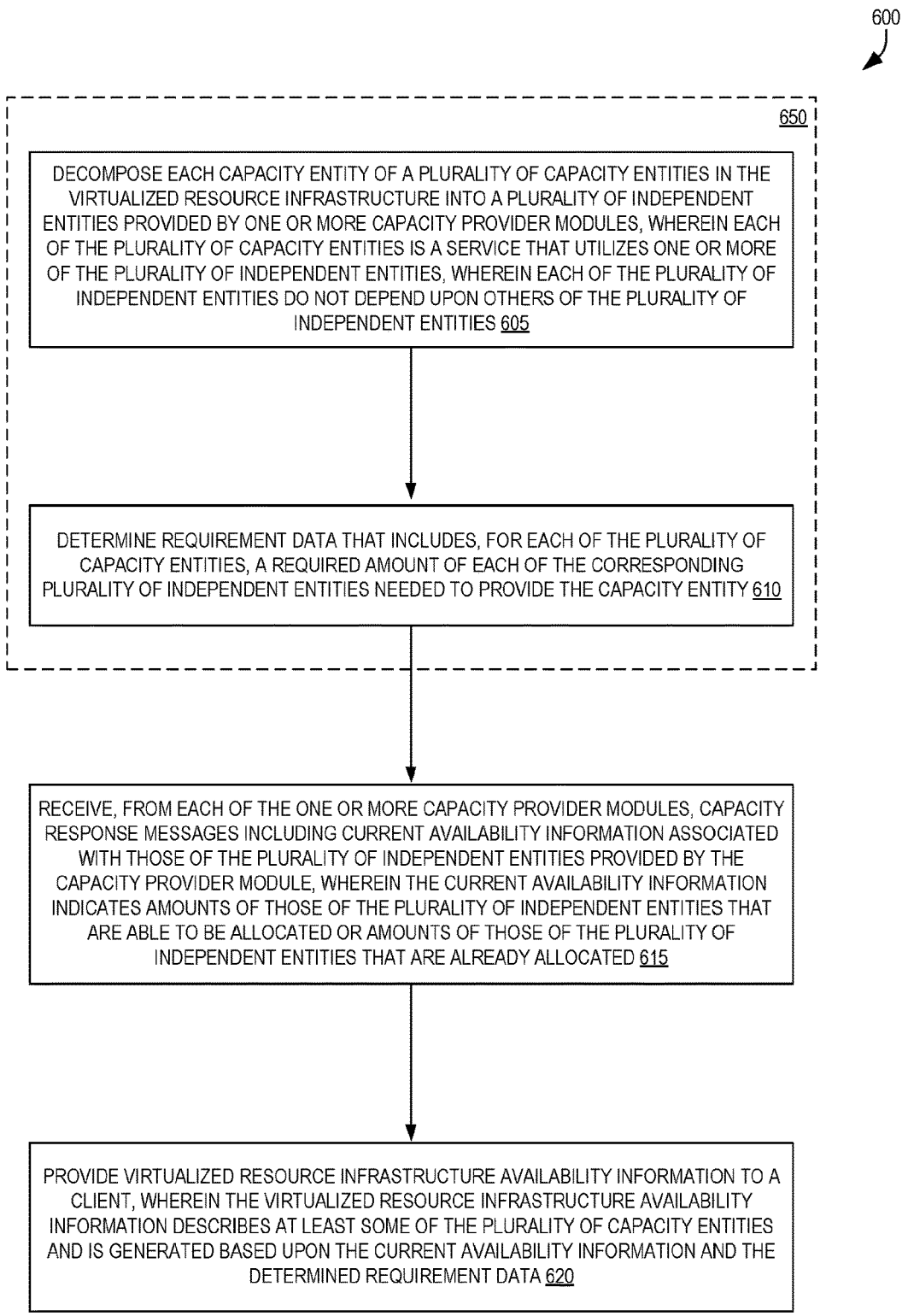
FIG. 6 is a flow diagram illustrating a flow that can be performed by a capacity manager for virtualized network capacity management according to some embodiments.

For further illustration, FIG. 6 is a flow diagram illustrating a flow 600 that can be performed by a capacity manager for virtualized network capacity management according to some embodiments.

Flow 600 includes, at block 605, decomposing each capacity entity of a plurality of capacity entities in a virtualized resource infrastructure into a plurality of independent entities provided by one or more capacity provider modules. Each of the plurality of capacity entities is a service that utilizes one or more of the plurality of independent entities, and each of the plurality of independent entities do not depend upon others of the plurality of independent entities. In some embodiments, block 605 can roughly correspond to block 510 (or be performed as part of block 510) of FIG. 5.

Flow 600 also includes, at block 610, determining requirement data that includes, for each of the plurality of capacity entities, a required amount of each of the corresponding plurality of independent entities needed to provide the capacity entity. In some embodiments, block 610 can roughly correspond to block 510 (or be performed as part of block 510) of FIG. 5.

In some embodiments, both blocks 605 and 610 may be performed as one block 650 and thus, they may not be separately performed but instead performed at as a same operation.

Flow 600 also includes at block 615 receiving, from each of the one or more capacity provider modules, capacity response messages including current availability information associated with those of the plurality of independent entities provided by the capacity provider module. The current availability information indicates amounts of those of the plurality of independent entities that are able to be allocated or amounts of those of the plurality of independent entities that are already allocated.

Flow 600 also includes, at block 620, providing virtualized resource infrastructure availability information to a client. The virtualized resource infrastructure availability information describes at least some of the plurality of capacity entities, and is generated based upon the current availability information and the determined requirement data.

Figure 7:
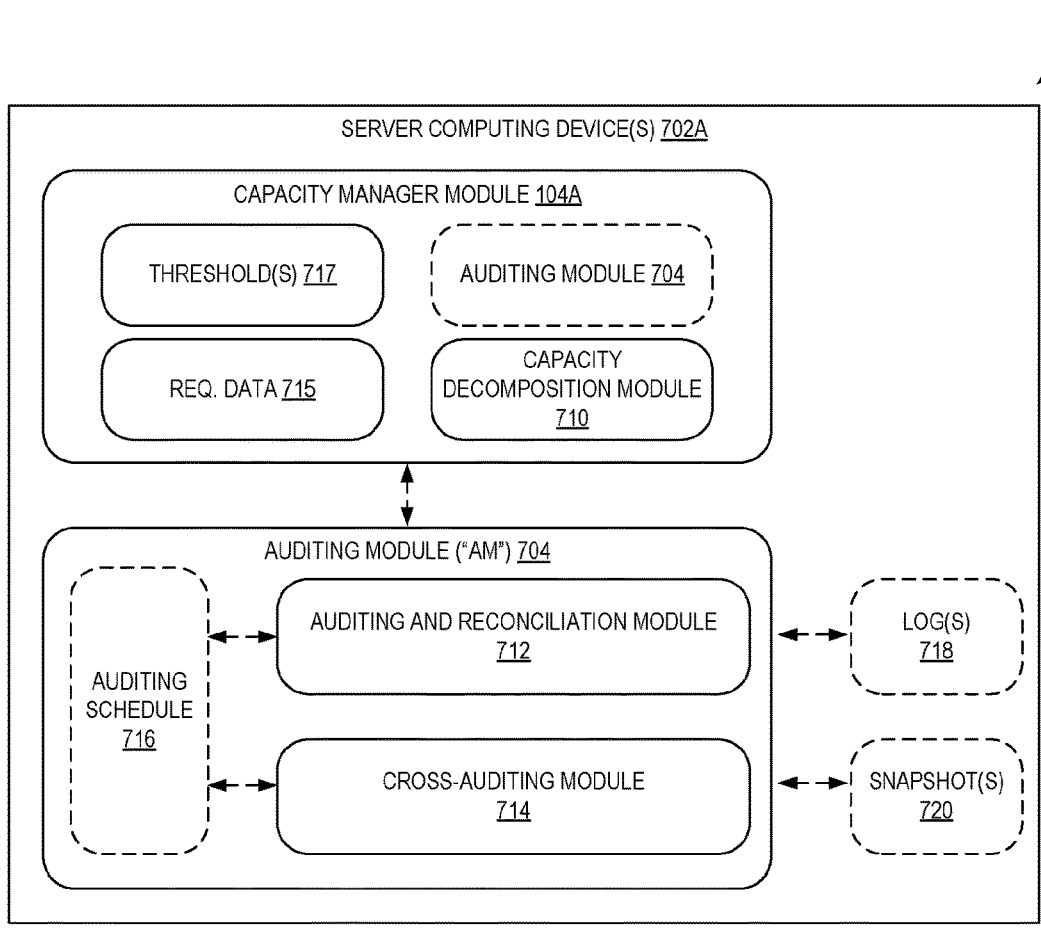
FIG. 7 includes two block diagrams illustrating server computing devices implementing capacity providers, capacity managers, and/or auditing modules according to some embodiments.
Figure 7:
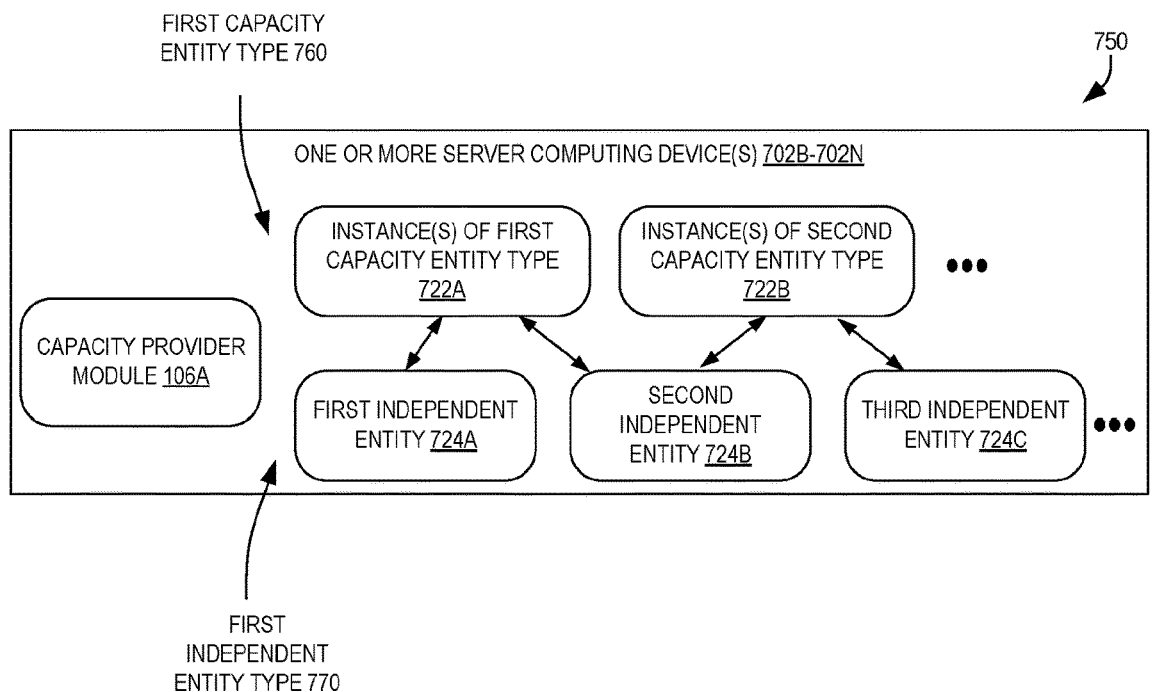

FIG. 7 includes two block diagrams 700/750 illustrating server computing devices 702 implementing capacity providers, capacity managers, and/or auditing modules according to some embodiments.

Diagram 700 illustrates one or more server computing devices 702A implementing a capacity manager module 104A and implementing an auditing module 704. In some embodiments, the capacity manager module 104A includes a capacity decomposition engine 710 that, for a given capacity provider, decomposes the collection of (most likely dependent) capacity entity types offered by that capacity provider into a collection of independent entity types. The capacity manager module 104A can also include requirement data 715 that includes, for each of the plurality of capacity entity types, a required amount of each of the corresponding plurality of independent entity types needed to provide the capacity entity types.

The capacity manager module 104A can also include one or more thresholds 717 as described herein. For example, the thresholds 717 can be used for comparing one or more thresholds corresponding to one or more of the plurality of independent entity types with some of the current availability information pertaining to the one or more of the plurality of independent entity types. In some embodiments, the capacity manager module 104A includes an auditing module 704, but in other embodiments the auditing module 704 is separate from the capacity manager module 104A.

The auditing module 704, or "AM", can include an auditing and reconciliation module 712 to perform the first and/or second types of auditing as described herein—i.e., capacity manger-provider auditing (i.e., audits between each capacity manager and the capacity providers that it manages), and/or capacity manager-manager auditing (i.e., audits between capacity managers). This auditing can occur according to an auditing schedule 716 indicating dates and/or times when the auditing is to be performed, durations between audits, etc.

In some embodiments, using any found discrepancies during an audit, the auditing and reconciliation module 712 can perform a reconciliation of these discrepancies detected during the audits to address the problems.

In some embodiments, the auditing module 704 includes a cross-auditing module 714, which can perform auditing analysis across multiple audits to detect/identify recurring patterns and then assist to isolate and possibly correct the root cause of the recurring problems. Such cross-auditing can occur according to the auditing schedule 716, and can include using one or both of logs 718 and/or snapshots 720 as described herein.

The second block diagram 750 of FIG. 7 illustrates one or more server computing devices 702B-702N implementing a capacity provider module 106A. On the same or different computing devices, an instance 722A of a first capacity entity type (of a first capacity entity type 760) is provided along with, on the same or different computing devices, an instance 722B of a second capacity entity type.

Notably, the instance 722A of a first capacity entity type utilizes both a first independent capacity entity 724A (of a first independent entity type 770) and second independent capacity entity 724B, while the instance 722B of a second capacity entity type utilizes both the second independent capacity entity 724B and a third independent capacity entity 724C. Thus, as described herein, the instances 722A-722B can be deemed "dependent" capacity entity types, and these instances 722A-722B can be "decomposed" into independent entities 724A-724C.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8A:
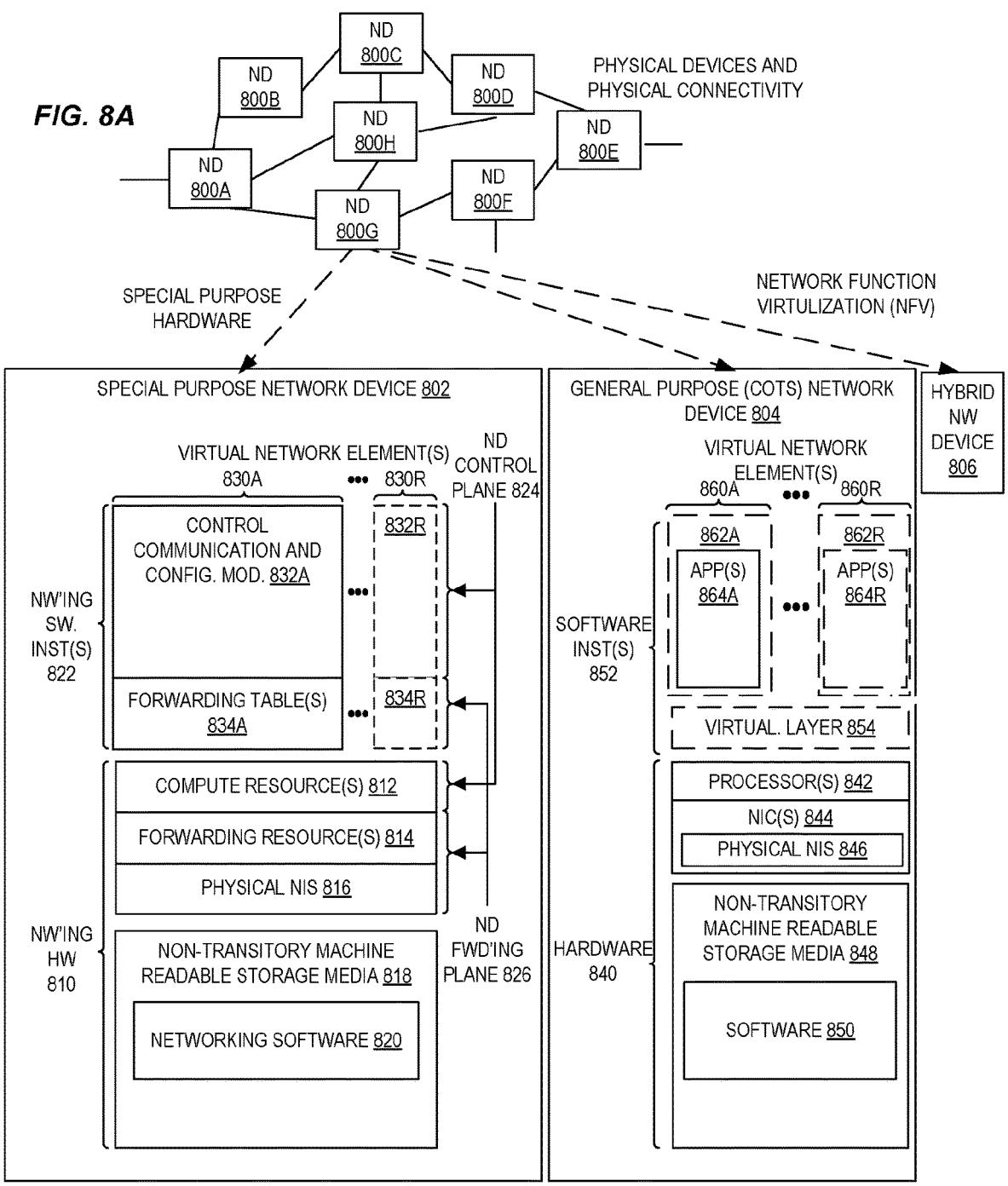
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media

818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-830R. Each of the virtual network element(s) (VNEs) 830A-830R includes a control communication and configuration module 832A-832R (sometimes referred to as a local control module or control communication module) and forwarding table(s) 834A-834R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the compute resource(s) 812 that execute the control communication and configuration module(s) 832A-832R; and 2) a ND forwarding plane 826 (sometimes referred to as a forwarding plane, a data plane, or a media plane) comprising the forwarding resource(s) 814 that utilize the forwarding table(s) 834A-834R and the physical NIs 816. By way of example, where the ND is a router (or is implementing routing functionality), the ND control plane 824 (the compute resource(s) 812 executing the control communication and configuration module(s) 832A-832R) is typically responsible for participating in controlling how data (e.g., packets) is to be routed (e.g., the next hop for the data and the outgoing physical NI for that data) and storing that routing information in the forwarding table(s) 834A-834R, and the ND forwarding plane 826 is responsible for receiving that data on the physical NIs 816 and forwarding that data out the appropriate ones of the physical NIs 816 based on the forwarding table(s) 834A-834R.

Figure 8B:
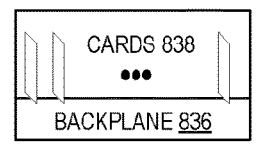
FIG. 8B illustrates an exemplary way to implement a special-purpose network device according to some embodiments.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol (IP) Security (IPsec), Secure Sockets Layer (SSL)/Transport Layer Security (TLS), Intrusion Detection System (IDS), peer-to-peer (P2P), Voice over Internet Protocol (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (or "NICs"; also known as network interface cards) (which include physical NIs 846), as well as non-transitory machine readable storage media 848 having stored therein software 850.

The software 850 can include code/instructions which, when executed, implement the processes described herein above. During operation, the processor(s) 842 execute the software 850 to instantiate one or more sets of one or more applications 864A-864R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-862R called software containers that may each be used to execute one (or more) of the sets of applications 864A-864R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-864R is run on top of a guest operating system within an instance 862A-862R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-862R, or as a combination of unikernels and the above-described techniques (e.g., unikernels and virtual machines both run directly on a hypervisor, unikernels and sets of applications that are run in different software containers).

The instantiation of the one or more sets of one or more applications 864A-864R, as well as virtualization if implemented, are collectively referred to as software instance(s)

852. Each set of applications 864A-864R, corresponding virtualization construct (e.g., instance 862A-862R) if implemented, and that part of the hardware 840 that executes them (be it hardware dedicated to that execution and/or time slices of hardware temporally shared), forms a separate virtual network element(s) 860A-860R.

The virtual network element(s) 860A-860R perform similar functionality to the virtual network element(s) 830A-830R—e.g., similar to the control communication and configuration module(s) 832A and forwarding table(s) 834A. This virtualization of the hardware 840 is sometimes referred to as Network Function Virtualization (NFV). NFV may be used to consolidate many network equipment types onto industry standard high volume server hardware, physical switches, and physical storage, which could be located in Data centers, NDs, and customer premise equipment (CPE). While embodiments are illustrated with each instance 862A-862R corresponding to one VNE 860A-860R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-862R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-862R and the NIC(s) 844, as well as optionally between the instances 862A-862R; in addition, this virtual switch may enforce network isolation between the VNEs 860A-860R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-830R, VNEs 860A-860R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, Global Positioning Satellite (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-862R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet Local Area Network (LAN) emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IP VPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 9:
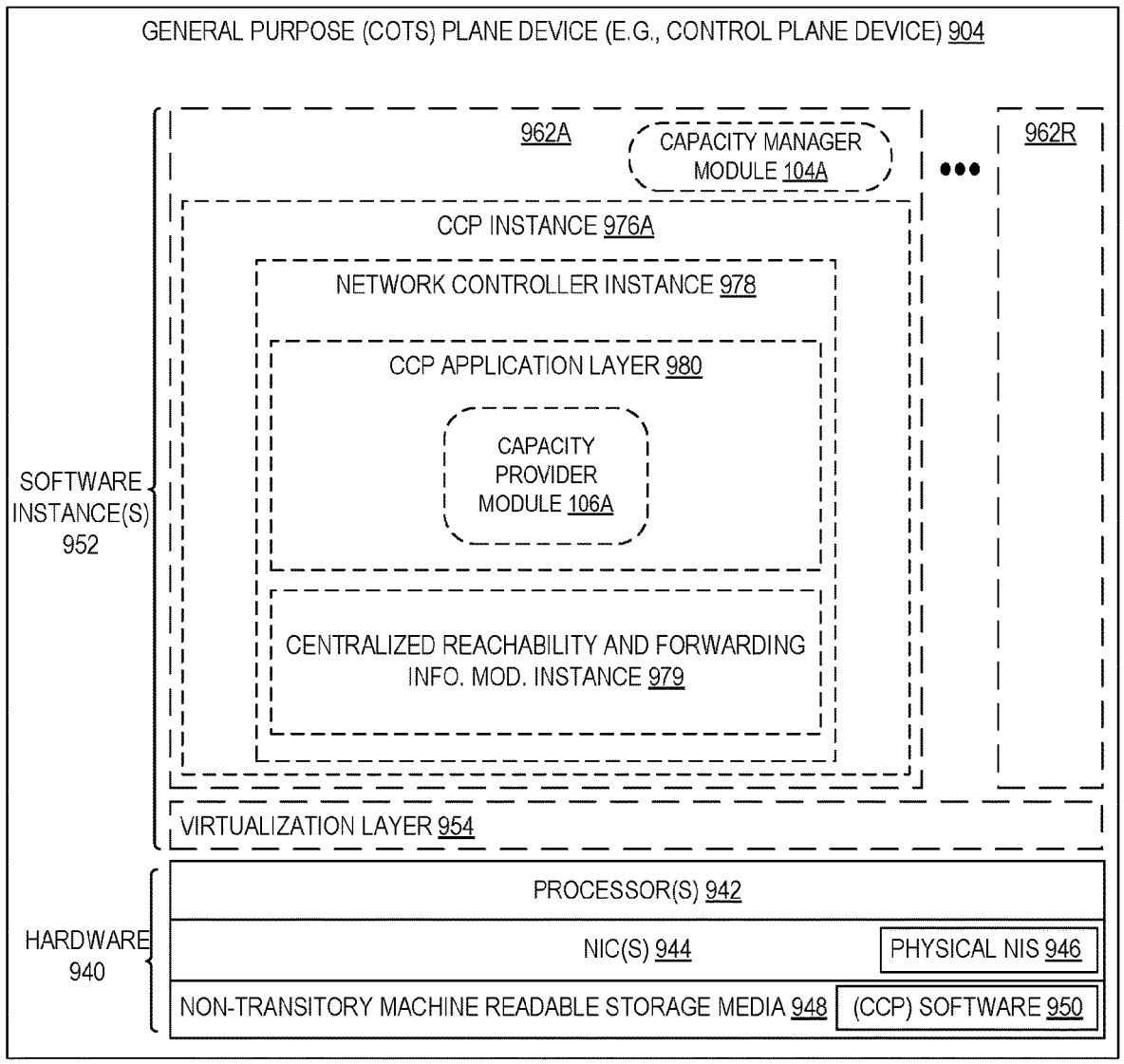
FIG. 9 illustrates a general purpose control plane device with centralized control plane (CCP) software, according to some embodiments.

Similar to the network device implementations, the electronic device(s) used in some embodiments to implement the various modules to perform the disclosed operations, etc., may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon software instructions (e.g., for implement a centralized control plane, etc.). For instance, FIG. 9 illustrates, a general purpose device 904 (e.g., a control plane device) including hardware 940 comprising a set of one or more processor(s) 942 (which are often COTS processors) and network interface controller(s) 944 (NICs; also known as network interface cards, which include physical NIs 946), as well as non-transitory machine readable storage media 948 having stored therein software 950 (e.g., centralized control plane (CCP) software).

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-962R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-962R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-962R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-962R if implemented, are collectively referred to as software instance(s) 952. The instances can, for example, implement the capacity manager modules (e.g., 104A) described herein.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 876 works with virtual network view(s) (logical view(s) of the network) and the middleware layer provides the conversion from the virtual networks to the physical view. In some embodiments, the centralized reachability and forwarding information module instance 979 can include the capacity provider module 106A and related software as described herein above.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a capacity manager module implemented by a computing device for accurately determining available capacity in a virtualized resource infrastructure, the method comprising:

decomposing, by the capacity manager module, each capacity entity type of a plurality of capacity entity types available for provisioning in the virtualized resource infrastructure into a plurality of independent entity types provided by one or more capacity provider modules, wherein each of the plurality of capacity entity types corresponds to a virtualized resource or service, wherein each of the plurality of capacity entity types, when executed as an instance, utilizes one or more of the plurality of independent entity types, wherein each of the plurality of independent entity types do not depend upon others of the plurality of independent entity types;

determining, by the capacity manager module, requirement data that includes, for each of the plurality of capacity entity types, a required amount of each of the plurality of independent entity types needed to provide the capacity entity types;

receiving, from each of the one or more capacity provider modules, capacity messages including current availability information associated with those of the plurality of independent entity types provided by the capacity provider module, wherein the current availability information indicates amounts of those of the plurality of independent entity types that are able to be allocated or amounts of those of the plurality of independent entity types that are already allocated; and providing, by the capacity manager module, virtualized resource infrastructure availability information to a client, wherein the virtualized resource infrastructure availability information describes at least some of the plurality of capacity entity types and is generated based upon the current availability information and the requirement data determined.

2. The method of claim 1, further comprising:
generating, by the capacity manager module, the virtualized resource infrastructure availability information, comprising:
comparing one or more thresholds corresponding to one or more of the plurality of independent entity types with some of the current availability information pertaining to the one or more of the plurality of independent entity types.

3. The method of claim 1, further comprising:
receiving, from a first capacity provider module of the one or more capacity provider modules, a capacity change message indicating that an amount of an independent entity type provided by the first capacity provider module has changed.

4. The method of claim 1, further comprising:
receiving, from a first capacity consumer, a first capacity request message indicating a desire to allocate one or more instances of one or more of the plurality of capacity entity types;
determining, based upon the at least some of the current availability information and at least some of the requirement data determined, that a second capacity provider module of the one or more capacity provider modules is to be sent a first capacity allocation request corresponding to the first capacity request message; and
transmitting the first capacity allocation request to the second capacity provider module to cause the one or more instances to be provided by the one or more capacity provider modules.

5. The method of claim 1, further comprising:
receiving, from a third capacity provider module, a capacity allocation information message indicating that one or more instances of one or more of the plurality of capacity entity types has been allocated responsive to the third capacity provider module receiving a second capacity request message from a second capacity consumer; and
updating, based upon the capacity allocation information message, the current availability information.

6. The method of claim 1, further comprising:
receiving, from a third capacity consumer, a third capacity request message indicating a desire to allocate one or more instances of one or more of the plurality of capacity entity types; and
transmitting a second capacity allocation request corresponding to the third capacity request message to a second capacity manager module that manages an other one or more capacity provider modules, to cause the one or more instances to be provided by the other one or more capacity provider modules.

7. The method of claim 1, further comprising:
initiating, by the capacity manager module, an audit process with each of the one or more capacity provider modules to detect, for each capacity provider module, whether a variance between an intended capacity allocation from a perspective of the capacity manager module and an actual capacity allocation from a perspective of the capacity provider module exists.

8. The method of claim 7, further comprising:
upon detecting the variance, transmitting a request message to attempt to cause the variance to be fixed.

9. The method of claim 8, wherein the request message comprises a request to allocate an instance of a capacity entity type of the plurality of capacity entity types.

10. The method of claim 8, wherein the request message comprises a request to de-allocate an instance of a capacity entity type of the plurality of capacity entity types.

11. The method of claim 1, further comprising:
initiating, by the capacity manager module, an audit process with a third capacity manager module to detect whether a variance between an intended capacity allocation from a perspective of the capacity manager module and an actual capacity allocation from a perspective of the third capacity manager module exists.

12. The method of claim 1, further comprising:
performing, by an auditing module, a cross-auditing process by examining auditing results from multiple historic audits from a log;
detecting, by the auditing module, a recurring allocation problem as a result of the performing of the cross-auditing process; and
transmitting a message to report the recurring allocation problem.

13. A non-transitory computer-readable storage medium having instructions which, when executed by one or more processors of a device, cause the device to implement a capacity manager module to perform operations for accurately determining available capacity in a virtualized resource infrastructure, the operations comprising:
decomposing each capacity entity type of a plurality of capacity entity types available for provisioning in the virtualized resource infrastructure into a plurality of independent entity types provided by one or more capacity provider modules, wherein each of the plurality of capacity entity types corresponds to a virtualized resource or service, wherein each of the plurality of capacity entity types, when executed as an instance, utilizes one or more of the plurality of independent entity types, wherein each of the plurality of independent entity types do not depend upon others of the plurality of independent entity types;
determining requirement data that includes, for each of the plurality of capacity entity types, a required amount of each of the plurality of independent entity types needed to provide the capacity entity types;
receiving, from each of the one or more capacity provider modules, capacity messages including current availability information associated with those of the plurality of independent entity types provided by the capacity provider module, wherein the current availability information indicates amounts of those of the plurality of independent entity types that are able to be allocated or amounts of those of the plurality of independent entity types that are already allocated; and
providing virtualized resource infrastructure availability information to a client, wherein the virtualized resource infrastructure availability information describes at least some of the plurality of capacity entity types and is generated based upon the current availability information and the determined requirement data determined.

14. The non-transitory computer-readable storage medium of claim 13, wherein the operations further comprise:
generating the virtualized resource infrastructure availability information, the generating comprising:

comparing one or more thresholds corresponding to one or more of the plurality of independent entity types with some of the current availability information pertaining to the one or more of the plurality of independent entity types.

15. The non-transitory computer-readable storage medium of claim 13, wherein the operations further comprise:
receiving, from a first capacity provider module of the one or more capacity provider modules, a capacity change message indicating that an amount of an independent entity type provided by the first capacity provider module has changed.

16. The non-transitory computer-readable storage medium of claim 13, wherein the operations further comprise:
receiving, from a first capacity consumer, a first capacity request message indicating a desire to allocate one or more instances of one or more of the plurality of capacity entity types;
determining, based upon the at least some of the current availability information and at least some of the requirement data determined, that a second capacity provider module of the one or more capacity provider modules is to be sent a first capacity allocation request corresponding to the first capacity request message; and
transmitting the first capacity allocation request to the second capacity provider module to cause the one or more instances to be provided by the one or more capacity provider modules.

17. The non-transitory computer-readable storage medium of claim 13, wherein the operations further comprise:
receiving, from a third capacity provider module, a capacity allocation information message indicating that one or more instances of one or more of the plurality of capacity entity types has been allocated responsive to the third capacity provider module receiving a second capacity request message from a second capacity consumer; and
updating, based upon the capacity allocation information message, the current availability information.

18. The non-transitory computer-readable storage medium of claim 13, wherein the operations further comprise:
receiving, from a third capacity consumer, a third capacity request message indicating a desire to allocate one or more instances of one or more of the plurality of capacity entity types; and
transmitting a second capacity allocation request corresponding to the third capacity request message to a second capacity manager module that manages an other one or more capacity provider modules, to cause the one or more instances to be provided by the other one or more capacity provider modules.

19. The non-transitory computer-readable storage medium of claim 13, wherein the operations further comprise:
initiating an audit process with each of the one or more capacity provider modules to detect, for each capacitor provider module, whether a variance between an intended capacity allocation from a perspective of the capacity manager module and an actual capacity allocation from a perspective of the capacity provider module exists.

20. A system, comprising:
one or more capacity provider modules implemented by a first set of one or more computing devices; and
a capacity manager module implemented by a second set of one or more computing, the capacity manager module comprising instructions that upon execution cause the capacity manager module to:
decompose each capacity entity type of a plurality of capacity entity types available for provisioning in a virtualized resource infrastructure into a plurality of independent entity types provided by the one or more capacity provider modules, wherein each of the plurality of capacity entity types corresponds to a virtualized resource or service, wherein each of the plurality of capacity entity types, when executed as an instance, utilizes one or more of the plurality of independent entity types, wherein each of the plurality of independent entity types do not depend upon others of the plurality of independent entity types;
determine requirement data that includes, for each of the plurality of capacity entity types, a required amount of each of the plurality of independent entity types needed to provide the capacity entity;
receive, from each of the one or more capacity provider modules, a capacity message including current availability information associated with those of the plurality of independent entity types provided by the capacity provider module, wherein the current availability information indicates amounts of those of the plurality of independent entity types that are able to be allocated or amounts of those of the plurality of independent entity types that are already allocated; and
provide virtualized resource infrastructure availability information to a client, wherein the virtualized resource infrastructure availability information describes at least some of the plurality of capacity entity types and is generated based upon the current availability information and the requirement data determined.

* * * * *